United States Patent [19]

Asakawa et al.

[11] Patent Number: 4,762,006
[45] Date of Patent: Aug. 9, 1988

[54] FORCE-DETECTING APPARATUS

[75] Inventors: Kazuo Asakawa; Nobuhiko Onda, both of Kawasaki; Tadashi Akita, Oyama; Toru Kamada, Yokohama, all of Japan

[73] Assignee: Fujitsu Limited, Kawasaki, Japan

[21] Appl. No.: 779,640

[22] Filed: Sep. 24, 1985

[30] Foreign Application Priority Data

Sep. 29, 1984 [JP] Japan ............................. 59-205721
Mar. 20, 1985 [JP] Japan ............................. 60-057414
Jun. 7, 1985 [JP] Japan ............................. 60-122738
Jun. 7, 1985 [JP] Japan ............................. 60-122739

[51] Int. Cl.$^4$ .................... G01L 5/16; G01L 1/22
[52] U.S. Cl. ................................................. 73/862.04
[58] Field of Search ........... 73/862.04, 862.05, 862.06; 901/9, 46

[56] References Cited

U.S. PATENT DOCUMENTS

| 3,915,015 | 10/1975 | Crane et al. ............... 73/862.04 X |
| 4,448,083 | 5/1984 | Hayashi ..................... 73/862.04 |
| 4,467,661 | 8/1984 | Somal ........................ 73/862.65 X |
| 4,573,362 | 3/1986 | Amlani ....................... 73/862.04 |
| 4,577,513 | 3/1986 | Harwood et al. ............ 73/862.04 |
| 4,635,479 | 1/1987 | Salisbury, Jr. et al. ...... 73/862.04 |

FOREIGN PATENT DOCUMENTS

| 53-103782 | 9/1978 | Japan . |
| 54-39672 | 3/1979 | Japan . |
| 54-28181 | 3/1979 | Japan . |
| 54-133176 | 10/1979 | Japan . |
| 54-153080 | 12/1979 | Japan . |
| 54-158281 | 12/1979 | Japan . |
| 60-62497 | 4/1985 | Japan . |

OTHER PUBLICATIONS

Lecture Paper for Hitachi Domestic Lecture issued Sep. 11, 1984.

Primary Examiner—Charles A. Ruehl
Attorney, Agent, or Firm—Staas & Halsey

[57] ABSTRACT

A force-detecting apparatus includes an elastic member deformable symmetrically with respect to the center. First displacement-detecting means, detect displacements of the elastic member, at positions symmetric with respect to the center, in the same direction with respect to an axis passing through the center of the elastic member, and second displacement-detecting means detect displacements of the elastic member, at the positions symmetric with respect to the center, in opposite directions with respect to an axis passing through the center of the elastic member.

12 Claims, 26 Drawing Sheets

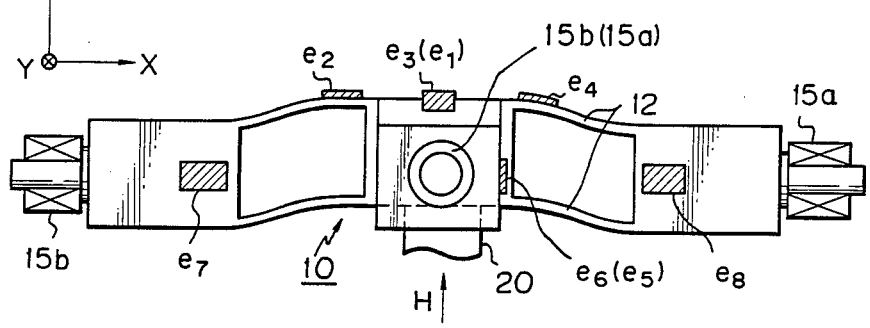
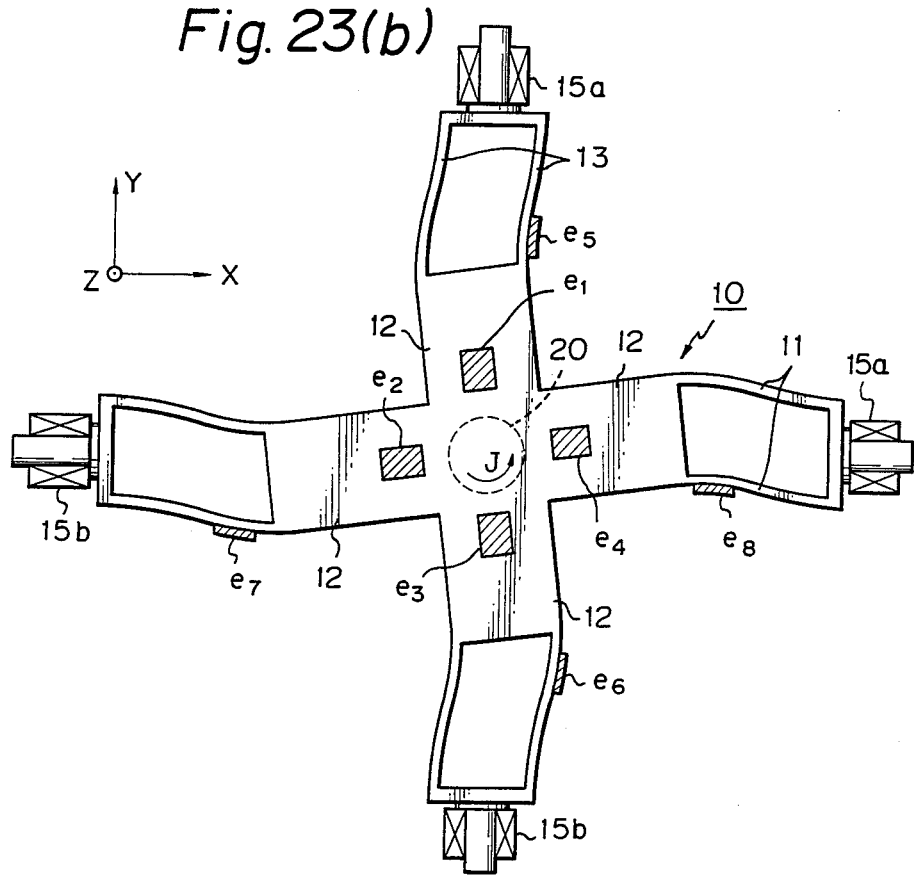

Fig. 24(a)
Fig. 24(b)
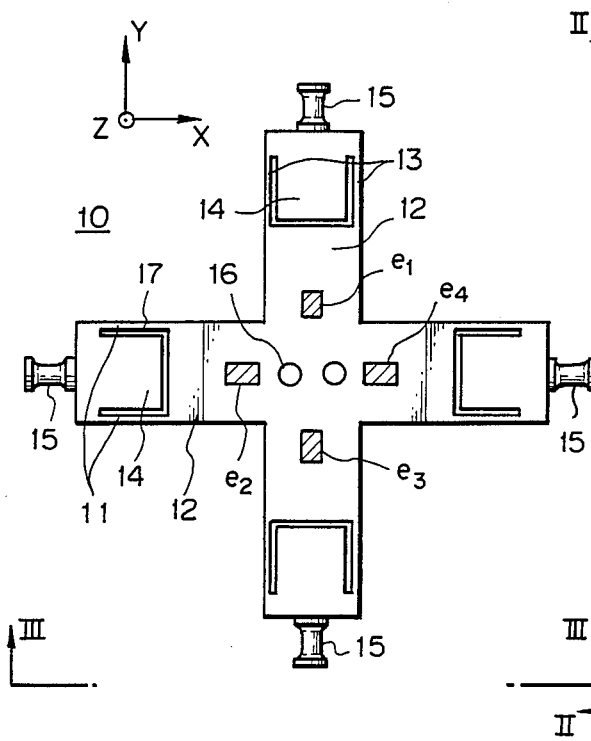
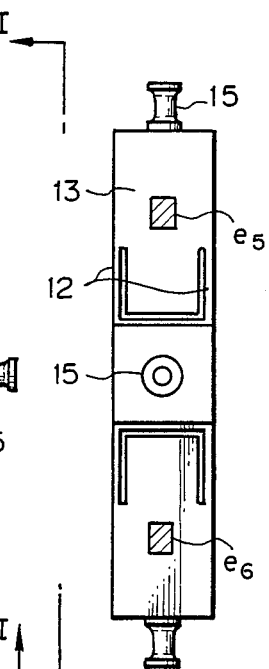
Fig. 24(c)
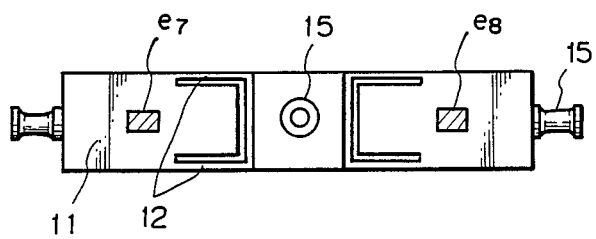

FORCE-DETECTING APPARATUS

CROSS-REFERENCE TO RELATED APPLICATION

This application is related to co-pending U.S. patent application Ser. No. 533,976, filed Sept. 20, 1983, for SUPPORTING DEVICE, and assigned to the assignee of the subject application abandoned in favor of continuation Application Ser. No. 876,663, filed June 20, 1986.

BACKGROUND OF THE INVENTION (1) Field of the Invention

The present invention relates to an apparatus for detecting an external force applied to, for example, a robot hand arranged on the top end of an arm of a robot.

(2) Description of the Related Art

Recently, there is a wide-spread introduction of industrial robots into production lines. However, since a position control type robot operates regardless of any restricting force caused by environmental factors, it is very difficult to use this type of robot for the automation of an assembly line in which a delicate force adjustment is required. This is because such an assembly operation involves many operations in which the high precision measurement of the relative positional relationship is more important than the absolute positions of parts, such as the fitting and attaching of parts.

If the fitting of a part is carried out by using a position control type robot, it is necessary to precisely program the robot coordinates for the moving locus determined from the object of assembling, and to precisely control the top end according to the predetermined locus. However, in practice with a position control type robot, it is very difficult to increase the precision of the absolute position because of inherent mechanical errors in the robot or because of control errors. Accordingly, in a robot used in such an assembly operation, a compliance mechanism is arranged on a wrist between the robot and a hand, to absorb any error in the relative position between the robot and the object.

However, since only a small quantity of error can be amended or absorbed, i.e., corrected, by the compliance mechanism arranged on the wrist, if the error of the relative position between the robot and the object is large, this error cannot be completely amended or absorbed. Accordingly, in the conventional robot of this type, a force-detecting apparatus (force sensor) is positioned so that it detects the above-mentioned error of the relative position as a reaction force acting on the wrist and corrects the position by feedback of the detected reaction force to the robot, so that the reaction force becomes zero. In short, control of the robot is changed from position control to force control.

In this arrangement, preferably the force sensor arranged on the wrist is rigid; a compliance mechanism is not preferred for the force sensor. This is because that if the wrist is composed of the compliance mechanism, a robot hand holding an article easily vibrates due to an outer force such as an inertia force applied to the article at the time the arm stops. Therefore, a robot having, for example, four degrees of freedom cannot cancel the vibration in the directions of six degrees of freedom, which degrades the reliability of feed-back control of the robot by using the sensor. Also, a sophisticated technique is required in an assembling operation these days, and the operation is conducted in a complicated manner. In such a situation, if the robot wrist is too soft, the robot cannot bear the weight of the article or the hand itself and becomes incapable of the assembling operation.

In the conventional force-detecting apparatus (as explained in detail later), since the output of one strain gauge for detecting force or torque includes a plurality of force components, the various components of the force vectors cannot be independently detected. Accordingly, a complicated matrix operation circuit must be constructed to obtain the force components in the respective directions and the torque-separated outputs based on the outputs of the respective strain gauges, and furthermore, complicated operation expressions must be introduced for analyzing and calculating the force components and torques of the respective directions based on the outputs of the respective strain gauges, and thus a large amount of time is required for the operation. Accordingly, if this force-detecting apparatus is used for driving and controlling a robot, the control circuit becomes complicated and the cost is increased. Furthermore, a large amount of time is necessary for conversion and separation of the respective components of the external force and it is impossible to immediately control the robot at a high speed in correspondence to the external force.

SUMMARY OF THE INVENTION

It is therefore a primary object of the present invention to remove the above-mentioned defect of the conventional technique and provide a force-detecting apparatus in which the force components and torques in the directions X, Y and Z can be easily separated and detected.

In accordance with the present invention, there is provided a force-detecting apparatus comprising an elastic member deformable symmetrically with respect to its center, a first displacement-detecting means for detecting the displacements of the elastic member at positions symmetric with respect to the center in the same direction, and a second displacement-detecting means for detecting the displacements of the elastic member at positions symmetric with respect to the center in the opposite directions.

BRIEF DESCRIPTION OF THE DRAWINGS

FIGS. 24(a) and (c) are diagrams illustrating the structure of still another embodiment of the present invention;

DESCRIPTION OF THE PREFERRED EMBODIMENTS

To enable a better understanding of the present invention, a conventional force-detecting apparatus will be first described with reference to FIG. 33.

Figure 33:
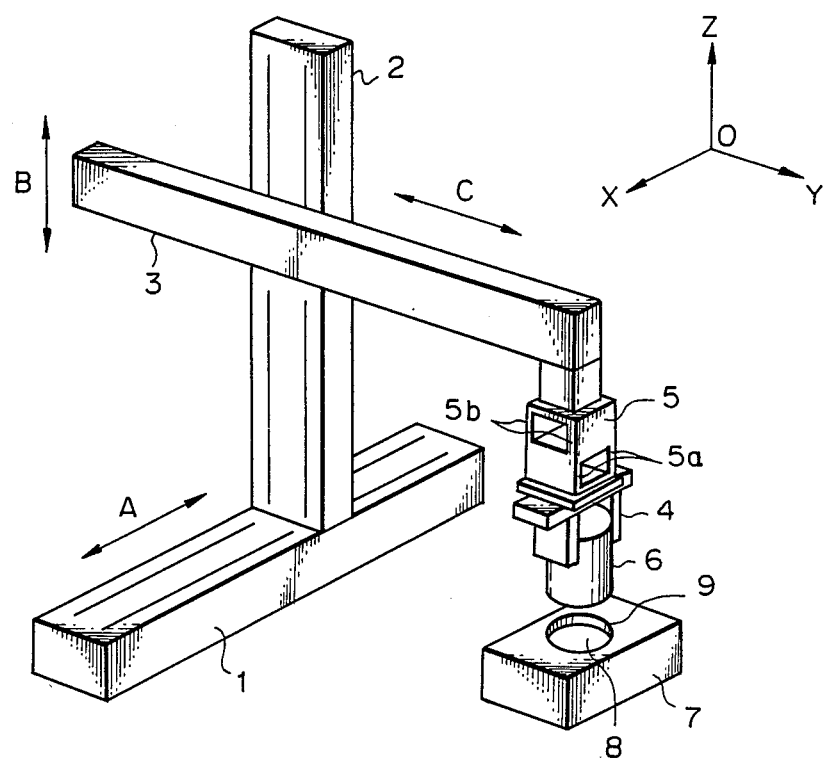
FIG. 33 is a diagram illustrating a conventional robot.

FIG. 33 is a schematic diagram illustrating a robot providing with a conventional force-detecting apparatus. The robot shown in FIG. 33 is a three-axis robot of the orthogonal axis type.

Referring to FIG. 33, a base 1 of a robot proper has an X-axis driving source (motor) for driving a first arm 2 (described below) in the direction of arrow A (X-axis). The first arm 2 has a Z-axis driving source (motor) for driving a second arm 3 in the direction of arrow B (Z-axis) and is moved in the direction of the X-axis by the X-axis driving source of the base 1. The second arm 3 has a Y-axis driving source (motor) for driving the arm in the direction of arrow C (Y-axis) with respect to the first arm 2 and is moved in the direction of the Z-axis by the Z-axis driving source (motor) of the first arm 2.

A force-detecting apparatus 5 is arranged on the end of the second arm 3 to detect a force applied to a hand 4. Accordingly, the hand 4 is positioned with respect to the direction of the X axis by the left-right movement of the first arm 2 and with respect to the directions of the Y-axis and Z-axis by the back-and-forth movement and vertical movement of the second arm 3, and thus three-dimentional positioning is accomplished by the three operation axes.

An article 6, for example, a round bar, is held by the hand 4. A part 7 has a hole 8 in which the article 6 is fitted, and a tapered surface 9 is formed in the hole 8.

The force-detecting apparatus shown in FIG. 33 comprises a parallel plate spring 5a which shifts in the direction X, a parallel plate spring 5b which shifts in the direction Y, and a cruciform plate spring, or cross-shaped leaf spring, (not shown) arranged on the upper or lower end and shifting in the direction Z. Each plate spring has a strain gauge (not shown) attached at an appropriate position to detect the displacement in the respective displacement directions.

This force-detecting apparatus 5 is attached to the wrist portion of the robot to make the robot perform the operation of fitting the article 6 into the hole 8 of the part 7. If an error arises in the relative position between the article 6 and the hole 8, an external force is applied to the hand 4, the respective plate springs of the force-detecting apparatus 5 are deformed according to this external force, and the strain gauges detect the displacement quantities of the plate springs. The force components in the directions X, Y and Z and the torques are calculated based on these displacement quantities, and the respective arms are driven and controlled so that the external force applied to the hand is cancelled, whereby the hand is moved to the correct position. However, such a conventional force-detecting apparatus has drawbacks as described before.

The principle of separately detecting the force and torque according to the force-detecting apparatus of the present invention will now be described with reference to FIGS. 1 through 3.

Figures 1A, 1B, 2:
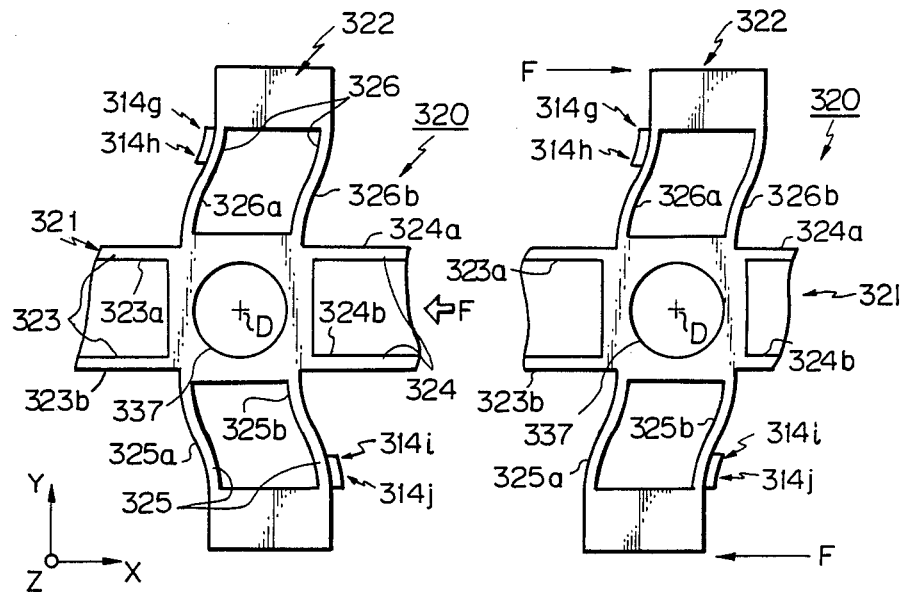
FIGS. 1(a) and (b) are diagrams illustrating a method for detecting the force according to the present invention.
FIG. 2 is a block diagram of a bridge circuit used in the present invention.
Figure 3A:
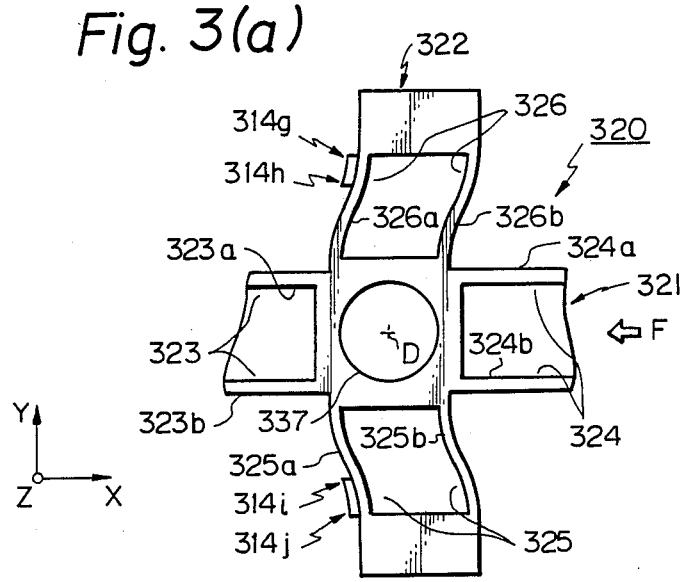
FIGS. 3(a) and (b) are diagrams illustrating another method for detecting the force according to the present invention.
Figure 3B:
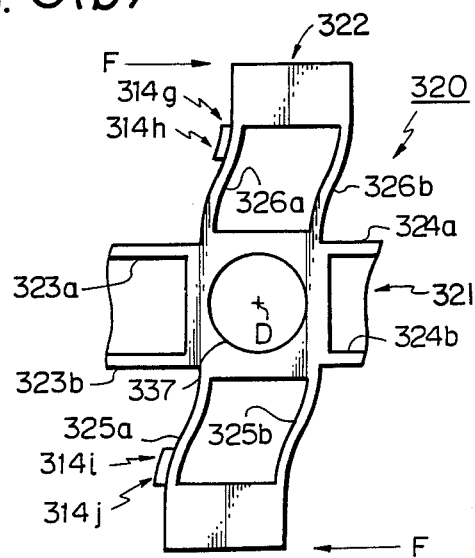

In the FIGS. 1–3, an angular rod 321 oriented in the direction X is constructed by parallel plate springs 323 and 324 arranged in the direction X, and an angular rod 322 of the direction Y is constructed by parallel plate springs 325 and 326, arranged in the direction Y. A cruciform plate spring assembly is constructed by both the angular rods 321 and 322. Each plate spring is deformable symmetrically with respect to the central point D. In FIGS. 1(a) and (b), strain gauges 314g through 314j are attached to the opposite sides of the angular rod 322, as an elastic member, but in FIG. 3, strain gauges are attached to a common side. In FIG. 1(a), if a force F displacing the central point D is applied, strain gauges 314g and 314h contract while strain gauges 314i and 314j extend. Accordingly, the respective strain gauges detect the displacements of the elastic member at the positions symmetric with respect to the central point D in the opposite directions (extension and contraction). As shown in FIG. 1(b), if a torque acts around the central point D, the respective strain gauges detect the displacements in the same direction (extensions or contractions) (in FIG. 1(b), the gauges detect contractions). If a bridge circuit, as shown in FIG. 2, is constructed with the strain gauges shown in FIGS. 1(a) and (b), the force in the direction of the X-axis can be separately detected while reducing the output of the bridge circuit to zero based on the deformations of the strain gauges by the torque. Furthermore, where a similar force and torque act, if strain gauges are attached as shown in FIG. 3, the respective strain gauges detect the displacements in the same direction (contractions) when a force acts (FIG. 3(a)) and the respective strain gauges detect the displacements in the opposite directions (extension and contraction) when a torque acts (FIG. 3(b)). If a bridge circuit as shown in FIG. 2 is constructed using the strain gauges, shown in FIGS. 3(a) and (b) the torque can be separately detected while reducing the output of the bridge circuit to zero based on the deformations of the strain gauges by the force in the direction of the X-axis. Accordingly, if the methods of attaching the strain gauges shown in FIGS. 1 and 3 are combined, both the force and torque can be separately detected based on the displacement of one elastic member.

In the FIGS. 1(a) and (b), reference numerals 323 through 326 represent parallel plate springs, each of reference numerals 323a through 326b represents each plate (leaf) spring of the parallel plate springs, and reference numerals 314g, 314h, 314i, and 313j represent strain gauges which are attached at positions symmetric with respect to the central line passing through the center D of the hole 337. Namely, the strain gauges 314g and 314h and the strain gauges 314i and 314j are attached to the plate springs 326a and 325b, respectively, and one located at positions symmetrically oriented with respect to the central point D, respectively. Note, the resistance value of each of the strain gauges 314g through 314j is R.

Output lines, (not shown) are connected to the respective strain gauges 314g through 314j so that a bridge circuit shown in FIG. 2 is constructed. Accordingly, if the force F is applied in the direction of the X-axis as, shown in FIG. 1(a), since the strain gauges 314g and 314h contract, the resistance value of these strain guages is reduced to (R−ΔR), and since the strain gauges 314i and 314j extend, the resistance value of these strain gauges is increased to (R+ΔR). Accordingly, the following voltage is produced between terminals a and b of the bridge circuit shown in FIG. 2:

$(R-\Delta R)i-(R+\Delta R)i=-2\Delta Ri$

If the force F is applied in the rotation direction as a torque, as shown in FIG. 1(b), since all of the strain gauges 314g, 314h, 314i and 314j contract, the following voltage is produced between terminals a and b:

$(R-\Delta R)i-(R-\Delta R)i=0$

Accordingly, if the strain gauges 314g through 314j are attached as shown in FIG. 1, and a bridge circuit as shown in FIG. 2 is constructed, the force in the direction of the X-axis can be separately detected without any influence from the torque.

In the foregoing description, only the force in the direction of the X-axis has been explained. However, as will be apparent to those skilled in the art, if strain gauges are similarly attached to plate springs 323b and 324b, the force in the direction of the Y-axis can be detected without any influence from the torque.

FIG. 3 is a diagram for explaining the method of detecting the torque around the axis without any influence of the force in the direction of the X-axis or Y-axis. In FIG. 3, the same members as those of FIG. 1 are represented by the same reference numerals as used in FIG. 1, and an explanation of these members is omitted. The structure shown in FIG. 3 is different from FIG. 1 in that the strain gauges 314i and 314j are attached to the plate spring 325a, rather than plate spring 325b. Namely, the strain gauges 314g through 314j are attached on the same side of angular rod 322 so that the distances of the strain gauges 314g through 314j from the central point D are equal.

If the force F is applied to plate springs 325 and 326 is in the direction along the X-axis, as shown in FIG. 3(a), all of the strain gauges 314g through 314j contract and the voltage between terminals a and b is as follows:

$(R-\Delta R)i-(R-\Delta R)i=0$

Furthermore, if the force F is applied as a torque around axis D, as shown in FIG. 3(b), the strain gauges 314g and 314h contract and the strain gauges 314i and 314j extend, and thus the voltage between terminals a and b is as follows:

$(R-\Delta R)i-(R+\Delta R)=-2\Delta Ri$

Accordingly, the force around the axis, that is, the torque, can be detected without any influence of the force in the direction of the direction of the X-axis.

Note, the strain gauges are arranged so that their distances from the central point are equal because the same voltage value is given to each strain gauge under the same force. Namely, if the distances of the strain gauges from the central point are different, the displacement quantities of the plate springs become different, and therefore, the output voltages become different.

If the plate springs are arranged so that they shift in the direction of the Z-axis, it is possible to detect each of the forces in the directions X, Y, and Z.

Figure 4:
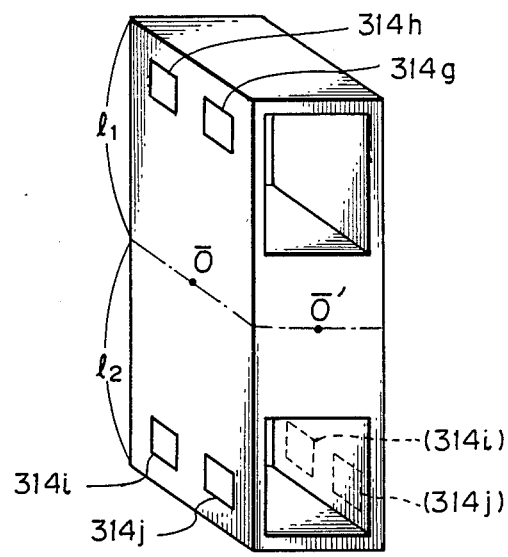
FIG. 4 is a diagram illustrating the attachment of a strain gauge according to the present invention.

As shown in FIG. 4, two strain gauges are arranged in parallel for each of the parallel plate springs. In FIG. 4, O and O' represent the central positions of the respective surfaces, as shown, and $l_1$ is equal to $l_2$. Since it is impossible to construct a plurality of bridge circuits by the same strain gauges, another pair of strain gauges 314i and 314j are independently attached.

Figure 5A:
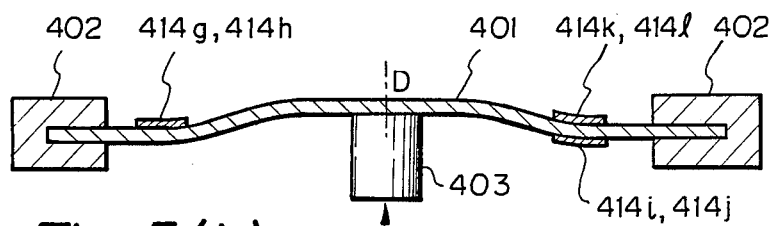
FIGS. 5(a) and (b) are diagrams illustrating a force-detecting method different from those illustrated in FIGS. 1 and 3.
Figure 5B:
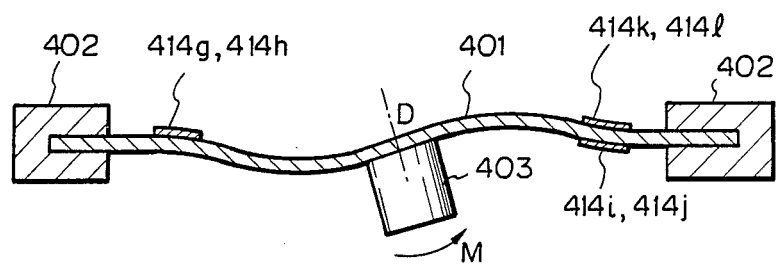
Figure 6A:
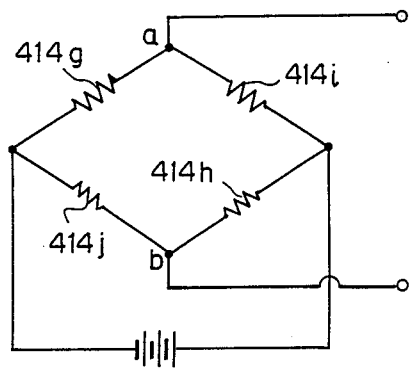
FIGS. 6(a) and (b) are block diagrams of bridge circuits used in the detecting method shown in FIGS. 5(a) and (b)
Figure 6B:
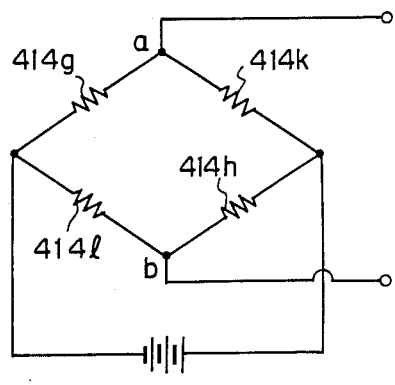

Even if the parallel plate springs are not used, but strain gauges are attached on the front and back faces of one plate spring at positions symmetric with respect to the center, as shown in FIG. 5, the force and torque can be separately detected as in the foregoing embodiment. Referring to FIG. 5, the outer edge of a plate spring 401 is secured to a supporting member 402 connected to, for example, a robot arm (not shown) and a wrist portion 403 is connected to, for example, a robot hand (not shown) is secured at the center portion of the plate spring 401. Strain gauges 414g through 414l are attached at positions symmetric with respect to the center D of the plate spring 401. FIG. 5(a) shows the state where the force F is applied to the wrist 403 in the direction normal to the plane of plate spring 401, and FIG. 5(b) shows the state where a rotary moment (torque) M is applied to the plate spring 401. By using the strain gauges 414g through 414l, two bridge circuits, shown in FIGS. 6(a) and 6(b), are constructed. By the bridge circuit shown in FIG. 6(a), the force F can be separately detected without any influence from the torque M, and by the bridge circuit shown in FIG. 6(b), the torque M can be separately detected without any influence of the force F. Note, in this embodiment, two strain gauges 414g and two strain gauges 414h should be attached at respective positions as in the foregoing embodiment.

Figure 7:
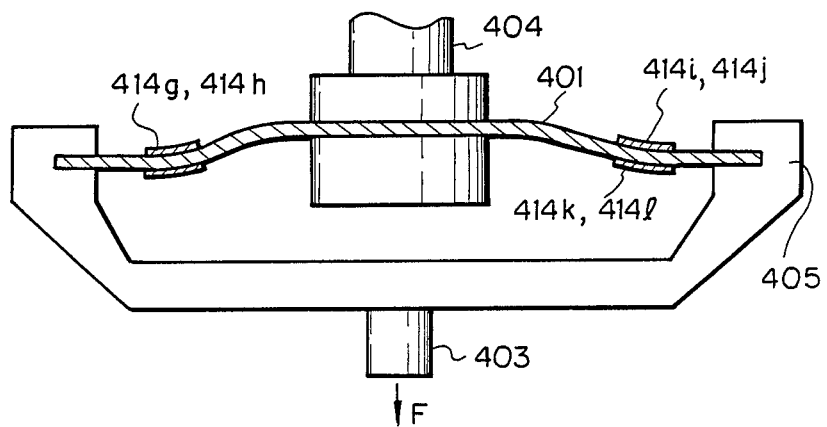
FIG. 7 is a diagram illustrating the structure of another embodiment of the present invention.

When the embodient shown in FIG. 5 is applied to a robot, as shown in FIG. 7, the peripheral edge portion of the plate spring 401 may be connected to the hand side and the central portion of the plate spring 401 may be connected to the arm side. The central portion of the plate spring 401 is secured to an arm-connecting member 404 and the peripheral portion of the plate spring 401 is connected to a wrist 403 through a supporting member 405.

Figure 8:
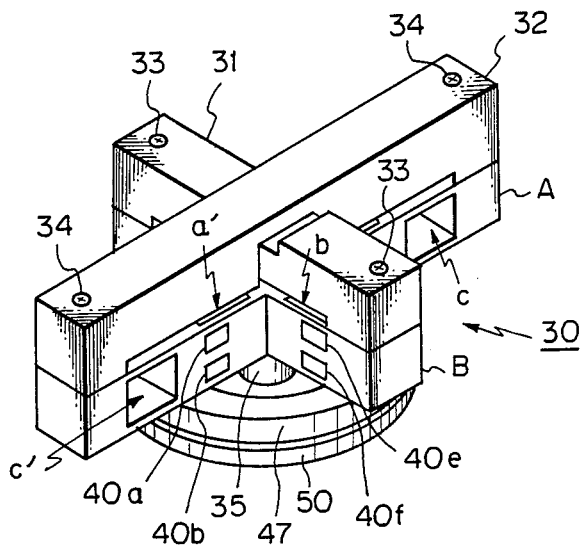
FIG. 8 is a perspective assembly diagram illustrating an embodiment of the force-detecting apparatus according to the present invention.
Figure 9:
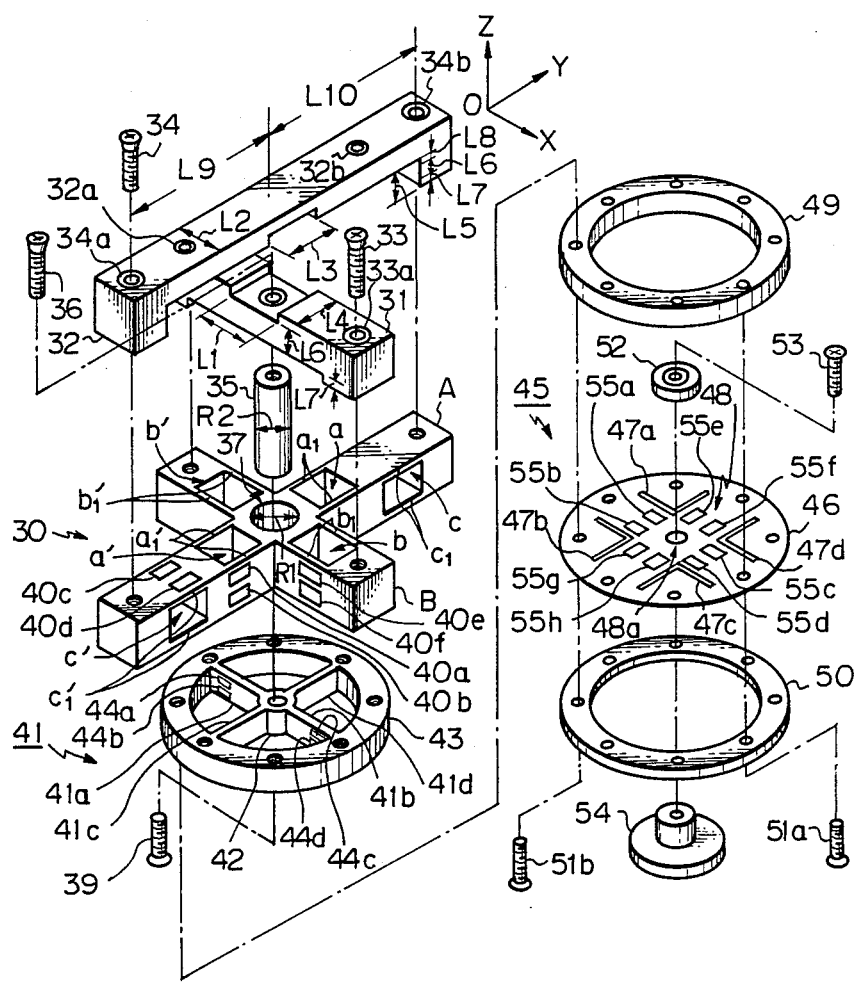
FIG. 9 is an exploded perspective view of the embodiment shown in FIG. 8.

FIGS. 8 and 9 illustrate an embodiment of the force-detecting apparatus according to the present invention, FIG. 8 being a perspective view and FIG. 9 being an exploded perspective view.

In FIGS. 8 and 9, reference numeral 30 represents a force-detecting module for detecting forces in the directions of the X-, Y- and Z-axes, and parallel plate springs $a_1$ and $a_1'$, $b_1$ and $b_1'$, and $c_1$ and $c_1'$ are constructed by forming angular holes a and a', b and b', and c and c' (by discharge processing or the like) on a cruciform structure comprising angular rods A and B extending in the directions X and Y.

As is apparent from FIG. 9, in the module 30, the parallel plate springs are arranged so that the displacement directions of the plate springs are orthogonal to each other. Accordingly, the force-detecting module 30 has degrees of freedom such that the deflection in the direcion of the X-axis is borne by the parallel plate springs a1 and a1', the deflection in the direction of the Y-axis is borne by the parallel plate springs b1 and b1', and the deflection in the direction of the Z-axis is borne by the parallel plate springs c1 and c1'.

The force-detecting module 30 is supported by supporting members 31 and 32, and the supporting member 31 is connected to the angular rod B by screws 33 and the supporting member 32 is connected to the angular rod A by screws 34. Note, one each of the screws 33 and the screws 34 is shown in the drawings. The screw hole 33a in which one screw 33 is fitted and the other screw hole 33b in which the other screw 33 is fitted are formed at positions which are separate by an equal distance from the center of the hole 37 of the cruciform structure, and similarly, the screw holes 34a and 34b in which the screws 34 are fitted are separate by an equal distance from the center of the hole 37 (L9=L10).

An output rod 35 is connected to the supporting member 31 by a screw 36 so that the output rod 35 is positioned in hole 37 formed in the force-detecting module 30.

In this embodiment, the supporting member 32 is secured to a base stand of, for example, a robot. Screws (not shown) to be fitted in the screw holes 32a and 32b are used to fix the supporting member 32 to the robot. Although the output rod 35 is arranged so that the output rod 35 is positioned in hole 37 formed in the force-detecting module 30, the output rod 35 may be arranged so that it is positioned in a hole in the supporting member 32. In this case, the supporting member 32 should be attached to the base stand on the opposite side (on the side of the angular rods A and B).

The dimensional sizes of the respective symbols are such that the relationships L1>L2, L3>L4, L5>(L6-L7), and R1>R2 are established, though a detailed explanation thereof is omitted. Note, the module 30 is deformed in the range of the clearance between engaging portions, for example, within the length of (L1-L2).

Strain gauges 40a, 40b, 40c, 40d, 40e, and 40f are arranged to detect displacements of the respective parallel plate springs a1', b1 and c1'. In order to detect forces in the directions of the respective axes without any influence from the torque, these strain gauges are attached symmetrically with respect to the hole 37 as the central point as shown in FIG. 1 so that bridge circuits are constructed as shown in FIG. 2. Accordingly, two strain gauges, not shown in the drawings, are also attached to each of the parallel plate springs a1, b1' and c1 symmetrically with respect to the hole 37 as the central point.

When the above-mentioned structure is adopted, for example, if the force in the direction of the X-axis is applied to the output rod 35, the force in the direction of the X-axis can be separately detected by detecting the displacements of the parallel plate springs a1 and a1'. Furthermore, when the force in the direction of the Y-axis or Z-axis is applied to the output rod 35, this force can be similarly, separately detected.

When the resulting force, having components in a plurality of directions is applied, since the positions of the angular rods A and B to which the force components are applied are separated by an equal distance from the center of the hole 37, the respective parallel plate springs can independently detect the respective force components.

A γ-module 41 is arranged to detect the torque around the Z-axis. This γ-module 41 comprises a central member 42 attached to the output rod 35 of the force-detecting module 30 through a screw 39 and an outer wheel 43 connected through plate springs 41a, 41b, 41c and 41d arranged to form a cruciform structure. Strain gauges 44a, 44b, 44c and 44d are attached to the plate springs in the same manner as shown in FIG. 3 (at positions symmetrically located with respect to the central point of the central member 42 on the same side of the plate springs with respect to the X-axis), whereby bridge circuits are similarly constructed.

In the drawings, the γ-module 41 is attached to the output rod 35 only by the screw 39 so that the central position of the γ-module 41 corresponds with the central position of the output shaft 35. However, in this structure, looseness of the screw 39 or the like is caused when the torque is given to the outer wheel 43. Accordingly, in practice, it is necessary that a pin projected from the central member 42 should be engaged with the output rod 35 to effect whirl-stop and the γ-module 41 should be secured by a screw at a position distant from the central position. A similar arrangement should be adopted for the connection between the output rod 35 and the supporting member 31.

In the above-mentioned structure, if the central member 42 is secured and a torque is given to the outer wheel 43 around the central axis (Z-axis), the plate springs 41a, 41b, 41c, and 41d bend. The bending is detected by the strain gauges 44a, 44b, 44c and 44d and the output is taken out through the bridge circuits, whereby only the torque around the Z-axis (γ) can be detected according to the principle explained hereinbefore with reference to FIG. 3.

Reference numeral 45 represents an αβ-module for detecting torques around the X- and Y-axes. This αβ-module 45 includes a diaphragm 48 consisting of a cruciform plate spring constructed by forming L-shaped slits 47a, 47b, 47c and 47d in a circular plate spring 46. This circular plate spring 46 is inserted between outer wheel members 49 and 50 and is secured to the γ-module 41 by screws 51a and 51b.

A flange 54 is attached to the central portion 48a of the diaphragm 48 through a member 52 by a screw 53, so that an article-processing apparatus such as a hand can be attached to the top end of the flange 54. Also, in this case, it is necessary that screw fixation should be performed at a position distant from the central position by using a pin or the like for effecting whirl-stop in the same manner as described above.

Strain gauges 55a, 55b, 55c, and 55d are attached symmetrically with respect to the central portion 48a on the same side of the diaphragm 48 with respect to the Z-axis to construct bridge circuits, so that the torque around the X-axis can be detected, and strain gauges 55e, 55f, 55g, and 55h are attached symmetrically with respect to the central portion 48a as the center to form bridge circuits, so that the torque around the Y-axis can be detected.

In the above-mentioned structure, if the outer wheel members 49 and 50 are secured and the torques around the X- and Y-axes (falling forces) are applied to the flange 54, in the central portion thereof, the diaphragm 48 bends. This bending is detected by each of the strain gauges 55a, 55b, 55c, 55d, 55e, 55f, 55g, and 55h and outputs are taken out through the bridge circuits, whereby the torques around the X- and Y-axes (α, β) can be independently detected.

If means for detecting forces and torques relative to the respective axes are modularized in the above-mentioned manner, modules can be appropriately combined according to the function of a robot to which the present invention is applied. For example, where the present invention is applied to a robot in which the robot hand moves in the directions X, Y, and Z, and rotates around the Z-axis, the above-mentioned force-detecting module 30 and γ-module 41 are combined. There may be adopted a modification in which the module is further divided into modules for detecting forces in the direction X, Y, and Z, respectively, and modules for detecting torques around the X-, Y-, and Z-axes, respectively, wherein appropriate modules are combined according to need. When a plurality of modules are combined, the central portions of these modules are connected to one another.

Figure 10:
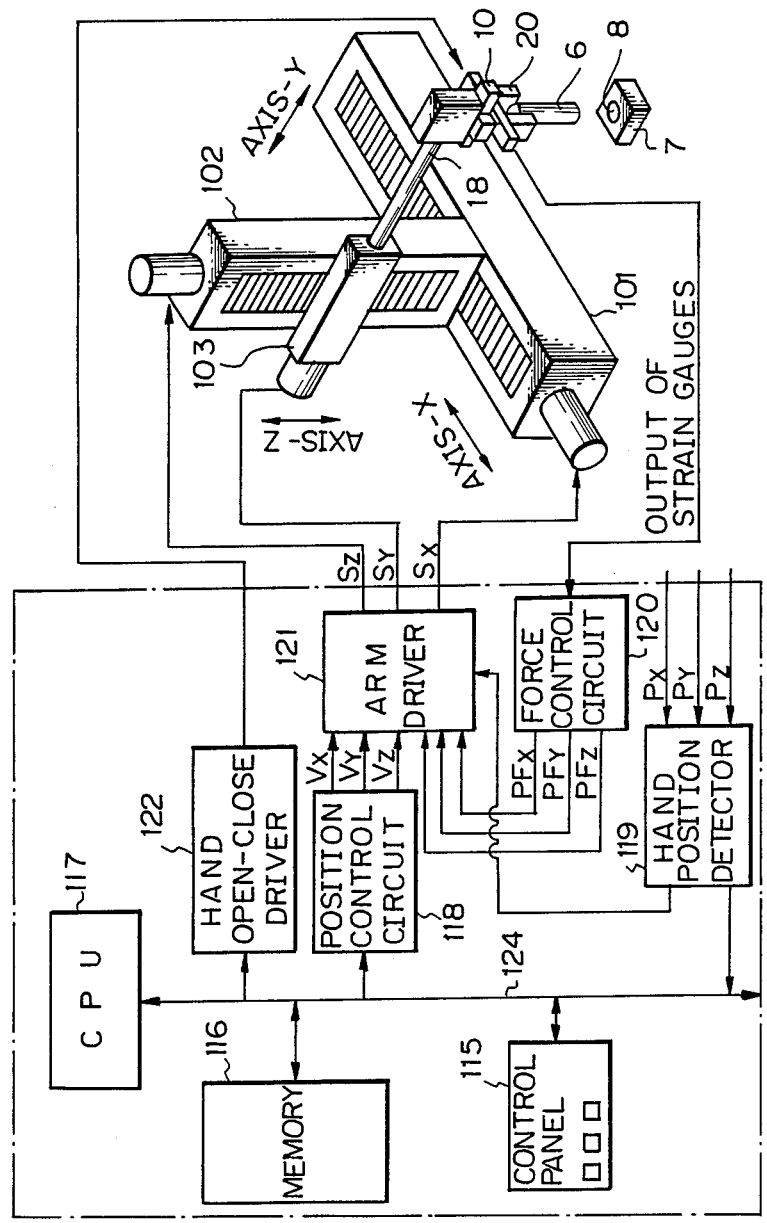
FIG. 10 is a diagram for explaining the control of a robot to which the present invention is applied.

FIG. 10 is a block diagram of a circuit for driving and controlling a robot provided with the force-detecting apparatus of the present invention. Referring to FIG. 10, a control panel 115, as an instructing zone, comprises a button for indicating a playback (renovation) mode or teaching mode for teaching the playback position to the robot, a button for storing the position or posture of the hand 20 and a button for instructing opening or closing of the hand 20 or return of the robot to the original point. Panel 115 is operated by an operator. A memory 116 is arranged to store instruction data and the like therein. A microprocessor (hereinafter referred to as "processor") 117 reads out instruction data from the memory 116 at the time of playback, prepares the instruction data from the memory 116 via bus bar 124 at the time of playback, prepares the instruction track for the hand 20 and feeds out this track to a position control circuit described hereinafter or feeds out the instruction for opening or closing the hand 20 to a hand open-close driver. The position control circuit 118 converts the displacement quantities of the instruction track in the directions of the respective axes to pulses Vx, Vy and Vz of the corresponding frequencies and outputs these pulses for controlling the position or speed according to the instruction track from the processor 117. The total control zone is constructed by the processor 117 and the position control circuit 118. A hand position detector 119 receives outputs Px, Py, and Pz of encoders mounted on driving sources (motors) for the respective axes and detects the three-dimensional position (X, Y, Z) of the hand 20. A force control circuit 120, comprising the above-mentioned bridge circuits constructed for the respective modules, receives output signals from the respective strain gauges attached to the force-detecting apparatus, and the force control circuit 120 outputs follow-up orders PFx, PFy, and PFz corresponding to the directions of the X-, Y-, and Z-axes. An arm driver circuit 121 servo-drives the driving sources for the respective axes based on the sums of the instructed displacement quantities Vx, Vy and Vz received from the position control circuit 118 and the follow-up displacement quantities PFx, PFy and PFz received from the force control circuit 120. An arm driving zone is constructed by the driving sources for the respective axes and the arm driver circuit 121, and a zone for driving the hand 20 is constructed by a base 101, arms 102 and 103, and the arm driving zone. A hand open-close driver 122 drives and opens or closes the hand 20 according to the hand open-close instructions of the processor 117. A bus bar 124 is laid out to connect the processor 117 to the memory 116, the control panel 115, the position control circuit 118, the hand position detector 119, and the hand open-close driver 122.

Figure 11:
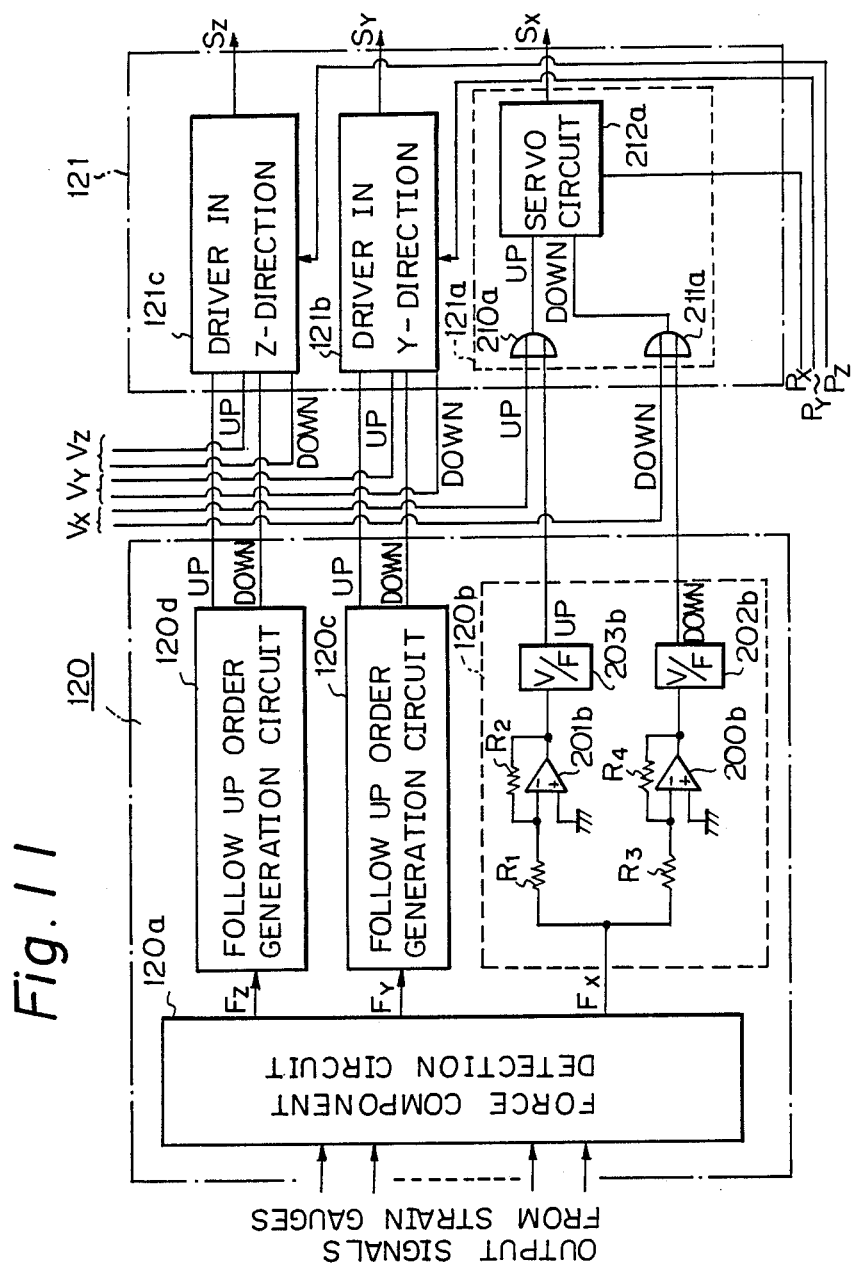
FIG. 11 is a block diagram of a circuit for driving the robot shown in FIG. 10.

FIG. 11 is a diagram of the details of the structures of the force control circuit 120 and arm driver circuit 121 shown in FIG. 10. Note, in FIG. 11, the same members as those shown in FIG. 10 are represented by the same reference numerals as used in FIG. 10. In FIG. 11, a force component detection circuit 120a is disposed to detect force components Fx, Fy, and Fz of the respective axes from outputs of the respective strain gauges as described hereinbefore. Follow-up order generation circuits 120b through 120d respectively output follow-up order pulses PFx, PFy and PFz of the force components Fx, Fy and Fz from the force component detection circuit 120a.

The follow-up order generation circuits 120b through 120d have the same structure. The follow-up order generating circuit 120b, for example, comprises gain adjusting amplifiers 200b and 201b and voltage/frequency converters (hereinafter referred to as "V/F converters") 202b and 203b. When the force component Fx has a positive polarity, a pulse row (up-pulse) having a frequency corresponding to the amplitude of the force component Fx is output as the follow-up order PFx, and when the force component Fx has a negative polarity, a pulse row (down-pulse) having a frequency corresponding to the amplitude of the force component Fx is output as the follow-up order PFx.

Reference numerals 121a through 121c represent driver circuits of the arm driver circuit 121 for the directions of the respective axes, and these driver circuits have the same structure. Namely, the driver circuits 121a through 121c receive the sums of the follow-up orders PFx, PFy, and PFz and moving orders Vx, Vy, and Vz, and output current signals (driving signals) Sx, Sy and Sz to the driving sources for the respective axes.

The driver circuit 121a comprises a pair of OR circuits, or gates, 210a and 211a and a servo circuit 212a. The OR circuit 210a applies the logic sum of the up-pulse of the moving order Vx and the up-pulse of the follow-up order PFx to the servo circuit 212a, and the OR circuit 211a provides the logic sum of the down-pulse of the moving order Vx and the down-pulse of the follow-up order PFx to the servo circuit 212a.

The servo circuit 212a comprises an up-down counter, a digital/analog converter (D/A converter) and a servo amplifier. The up-down counter counts up the output of the OR circuit 210a and counts down the output of the OR circuit 210a and simultaneously, the up-down counter counts down or up the position pulse Px from the position detector 119, and the difference between the instructed position and the displacement quantity is determined and converted to an analog quantity by the D/A converter. This signal is amplified by the servo amplifier and a current signal is output. This structure and function of the servo circuit 212a are well-known.

In the above-mentioned structure, if a force is applied to the hand 20, signals are output from the strain gauges corresponding to the force-applying direction in the force-detecting apparatus 10 and are input to the force component detection circuit 120a. The force components Fx, Fy, and Fz of the respective axes are detected in the force component detection circuit 120a based on the signals from the strain gauges, and are input to the follow-up order generating circuits 120b through 120d for the respective axes.

The follow-up order generating circuits 120b through 120d output up-pulses or down-pulses according to the polarities of the detected force components Fx, Fy, and Fz at frequencies corresponding to the amplitudes of the detected force components.

These follow-up orders, consisting of pulse rows, are input to the driver circuits 121a through 121c in addition to ordinary moving signals Vx through Vz, and they are output as current signals (driving signals) Sx, Sy and Sz for the driving sources of the respective axes to drive the X-, Y-, and Z-axes of the robot so that the force applied to the hand 20 is reduced to zero.

Figure 12:
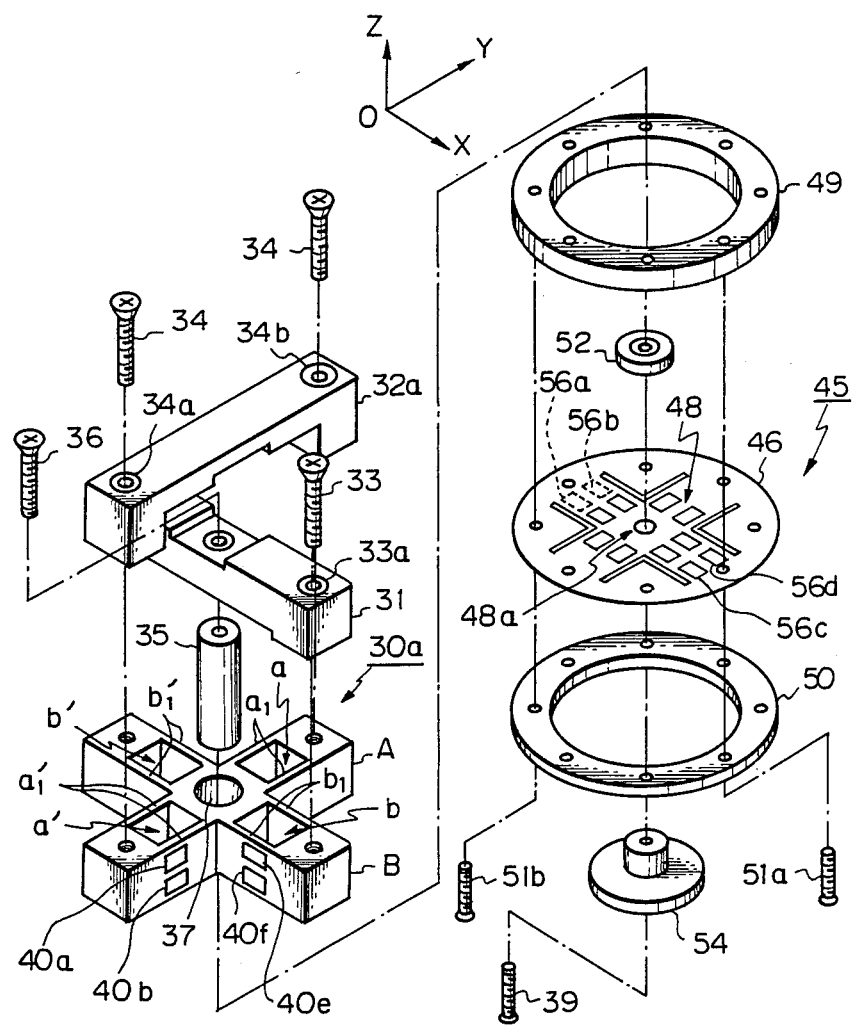
FIG. 12 is an exploded perspective view illustrating another embodiment of the force-detecting apparatus of the present invention.

FIG. 12 is a diagram of another embodiment of the force-detecting apparatus of the present invention. This embodiment is different from the embodiment shown in FIG. 9 in that the parallel plate springs for detecting the deflection in the direction of the Z-axis are removed so that the force-detecting module 30a can separately detect the forces in the two directions X and Y. The same members as those in FIG. 9 are represented by the same reference numerals as used in FIG. 9.

This structure can cope with a robot having two degrees of freedom. Also, this structure can detect the torque about the Z-axis by attaching further strain gauges (not shown) on the same side surface of the parallel plate springs b1, b1' or a1, a1', and constituting a bridge circuit as shown in FIG. 2 using these strain gauges. Therefore, the force-detecting module 30a has three degrees of freedom (X, Y, $\gamma$) in its detection ability, namely it can detects forces in the two directions of X and Y and the torque about the Z-axis. This construction can also be combined with a module for detecting torque about axes X and Y or a module for detecting torque about axes X and Y and force in the Z direction.

For example, a combination of the force detecting module 30a with the $\alpha\beta$-module 45, as shown in FIG. 12, will now be described. In this case, if the $\alpha\beta$-module 45 is directly connected to the output rod 35 through the flange 54 by the screw 39, a force-detecting apparatus of four degrees of freedom (X, Y, $\alpha$, $\beta$) or five degrees of freedom (X, Y, $\alpha$, $\beta$, $\gamma$) is constructed. Furthermore, in this case, the strain gauges 56a, 56b, 56c and 56d are attached to $\alpha\beta$-module 45 on the different faces of diaphragm 48 (strain gauges 56a and 56b on the back face and strain gauges 56c and 56d on the front face) and are symmetrically arranged with respect to the central portion 48a of the diaphragm 48. Bridge circuits are constructed in the same manner as in the embodiment shown in FIG. 1. Thus, the force component Fz in the direction of the Z-axis can be detected by the $\alpha\beta$-module 45 as in the embodiment shown in FIG. 1. In this case, a force-detecting apparatus having five degrees of freedom (X, Y, Z, $\alpha$, $\beta$) or six degrees of freedom (X, Y, Z, $\alpha$, $\beta$, $\gamma$) is constructed.

Figure 13:
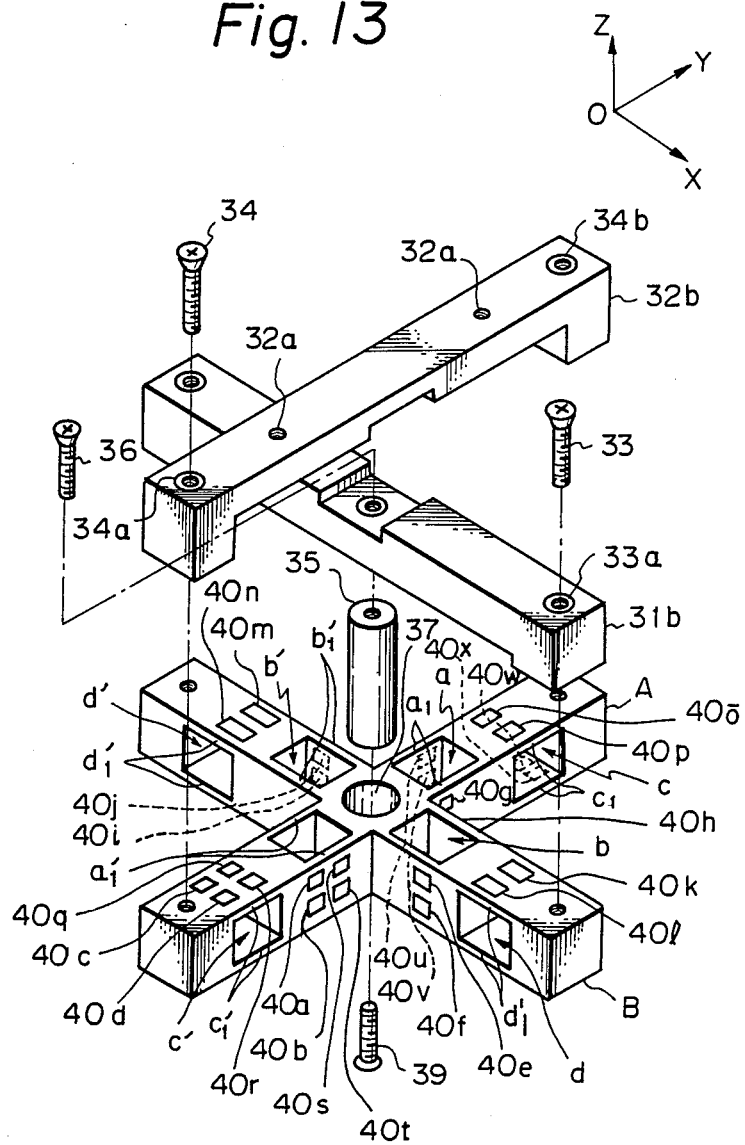
FIG. 13 is an exploded perspective view illustrating still another embodiment of the force-detecting apparatus of the present invention.

FIG. 13 is a diagram illustrating still another embodiment of the force-detecting apparatus of the present invention. This embodiment is different from the embodiment shown in FIG. 9 in that angular holes d and d' are formed on the top ends of the angular rod B to construct parallel plate springs $d_1$ and $d_1'$ deformable in the direction of the Z-axis, the supporting member for supporting the angular rod B is extended to form a supporting member 31b, and 24 strain gauges 40a through 40x in total are provided. Note, the same members as those shown in FIG. 9 are represented by the same reference numeral as used in FIG. 9.

If this structure is adopted, torques around the X-, Y- and Z-axes can be independently detected without using the $\gamma$-module 41 or the $\alpha\beta$-module 45. Forces in the X-direction are detected by the combination of strain gauges 40a, 40b, 40u, 40v, forces in the Y-direction are detected by the combination of strain gauges 40e, 40f, 40i, 40j, and forces in the Z-direction is detected by the combination of strain gauges 40c, 40d, 40w, 40x.

More specifically, strain gauges 40s, 40t, 40g, and 40h are attached to the parallel plate springs $a_1$, and $a_1'$ of the angular rod A on the same face side thereof, symmetrically with respect to the hole 37 as the central point to form bridge circuits, whereby the torque around the Z-axis can be independently detected as described hereinbefore with reference to FIG. 3.

Furthermore, strain gauges 40k, 40l, 40m, and 40n are attached to the parallel plate springs $d_1$ and $d_1'$ of the angular rod B on the same side thereof, symmetrically with respect to the hole 37 as the central point to form bridge circuits, whereby the torque around the Y-axis can be independently detected as described above.

Moreover, strain gauges 40q, 40r, 40o, and 40p are attached to the parallel plate springs $c_1$ and $c_1'$ of the angular rod A on the same side thereof, symmetrically with respect to the hole 37 as the central point to form bridge circuits, whereby the torque around the X-axis can be independently detected as described above.

In the above-mentioned structure, by forming parallel plate springs on a cruciform angular rod and attaching strain gauges to the parallel plate springs, the force components in the directions of the X-, Y- and Z-axes and the torques around the respective axes can be independently detected and $\alpha\beta$- and $\gamma$-modules becomes unnecessary. By selecting outputs from the strain gauges appropriately, the force-detecting apparatus can cope with any degree of freedom.

Figure 14:
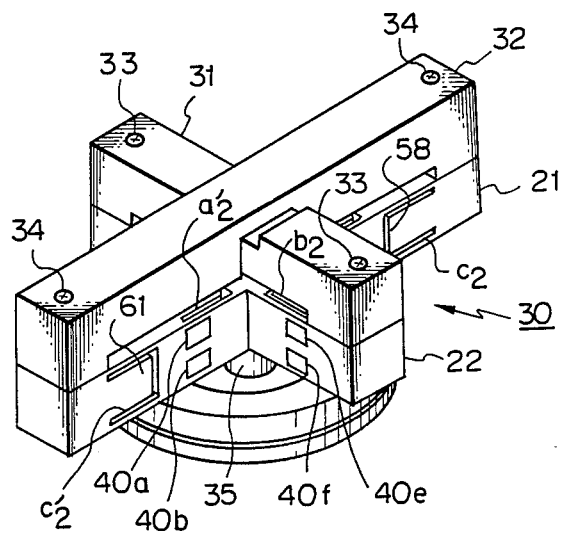
FIG. 14 is a perspective assembly diagram illustrating still another embodiment of the force-detecting appratus of the present invention.
Figure 15:
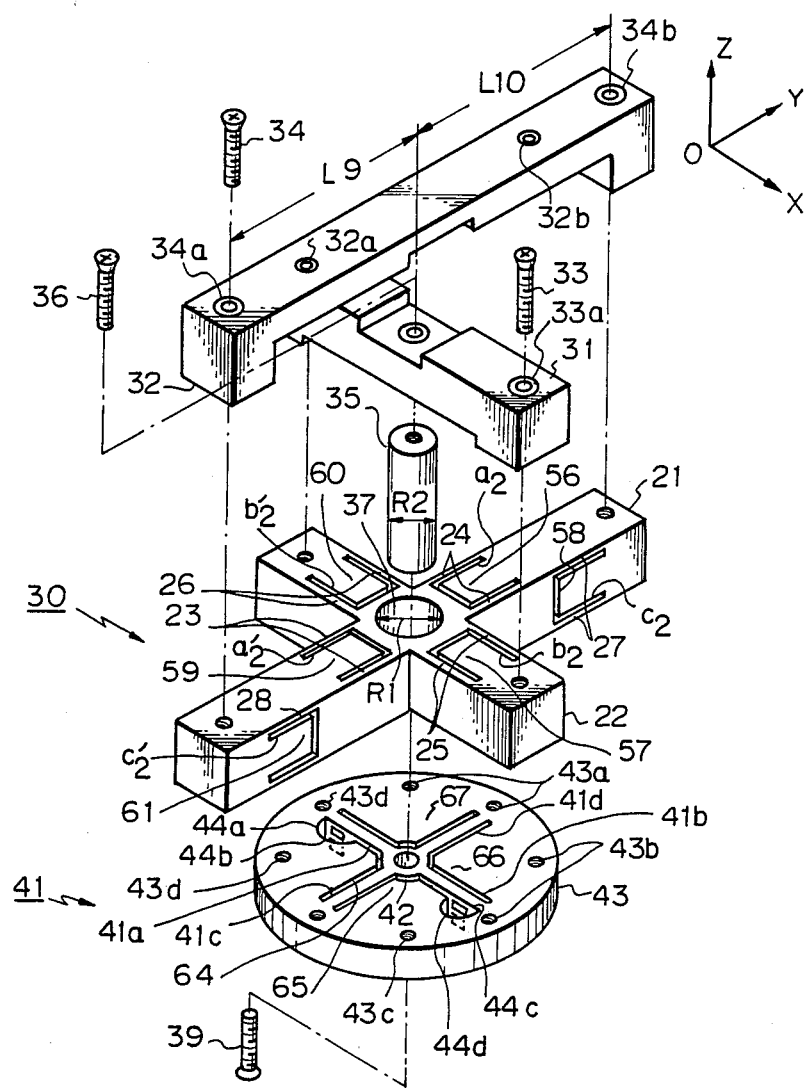
FIG. 15 is an exploded perspective view illustrating the embodiment shown in FIG. 14.
Figure 16A:
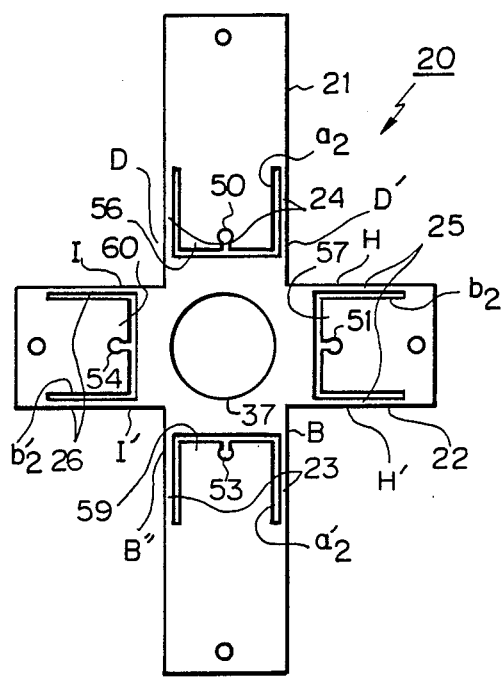
FIGS. 16(a) and (b) are diagrams illustrating the top face and side face of one constituent member of the embodiment shown in FIG. 15.
Figure 16B:
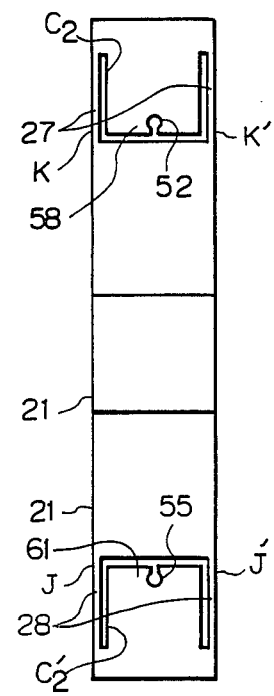
Figure 17:
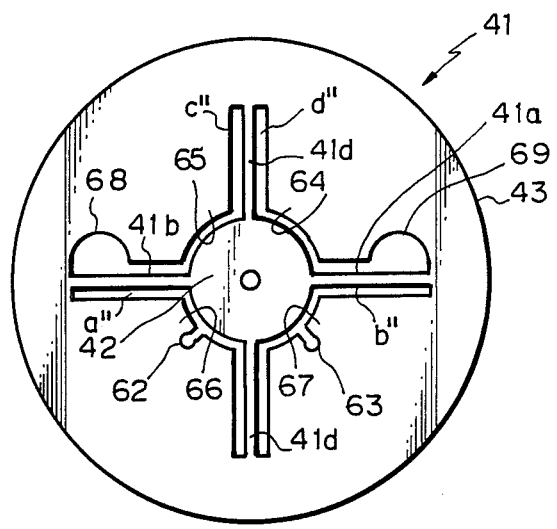
FIG. 17 is a diagram illustrating the top face and side face of another constituent member of the embodiment shown in FIG. 15.

FIGS. 14 and 15 illustrate an example of the supporting apparatus of the present invention, FIG. 14 being a perspective view and FIG. 15 being an exploded perspective view. FIG. 16(a) is a plane view of an XYZ module, and FIG. 16(b) is a side view thereof, and FIG. 17 is a plane view of a γ-module.

In FIGS. 14–17, reference numeral 30 represents a force-detecting module for detecting forces in the directions of the X-, Y-, and Z-axes, which is a cruciform structural body comprising angular rods 21 and 22 deformable in three directions X, Y and Z.

Slit-like clearances $a_2$, $a_2'$, $b_2$, $b_2'$, $c_2$, and $c_2'$ are formed by wire discharging processing, whereby parallel plate springs 23, 24, 25, 26, 27, and 28 are constructed on the angular rods 21 and 22. In FIG. 16, reference numerals 50, 51, 52, 53, 54, and 55 represent through holes formed in advance by a drill or the like for passing wires for wire discharging processing. These through holes are omitted in FIGS. 14 and 15. These through holes 50 through 55 can also be used as the wiring holes for guiding wires of the strain gauges.

Simultaneously with the formation of parallel plate springs 23 through 28 by formings slit-like clearances $a_2$, $a_2'$, $b_2$, $b_{1'}$, $c_2$, and $c_2'$ in this XYZ-module, there are formed displacement-regulating members 56, 57, 58, 59, 60, and 61 for regulating displacements of the parallel plate springs 23 through 28. More specifically, even if the parallel plate springs 23 through 28 are deformed by an external force, since the displacement-regulating members 56 through 61 are arranged with intervening fine clearances (corresponding to the wire diameter, about 0.3 mm), deformations exceeding these clearances are not permitted. Accordingly, if the thickness of the plate springs is reduced, buckling is not caused even under an excessive external force.

In the γ-module 41, shown in FIG. 17 slits a″ through d″ are formed by discharging processing to form plate springs 41a through 41d, and displacement-regulating members 64 through 67 are arranged to regulate displacements of the plate springs 41a through 41d. Reference numerals 68 and 69 represent operation spaces for attaching strain gauges to the plate springs 41a and 41b.

Figure 18:
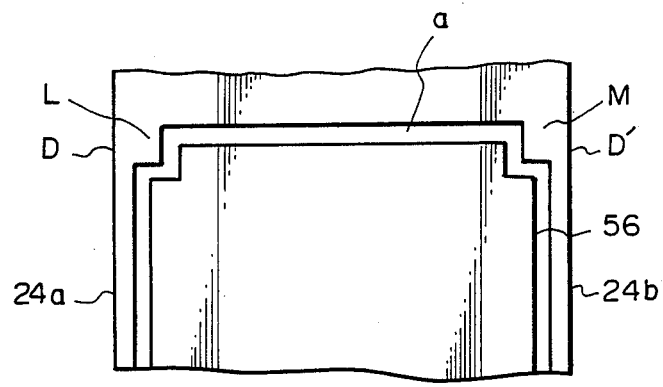
FIG. 18 is a diagram illustrating the structure of still another embodiment of the present invention.

In order to prevent deterioration of the plate springs 23 through 28 caused by abutting contact of these plate springs with angular ends of the displacement-regulating members 56 through 61, thick reinforcing portions L may be formed on the end portions of the plate springs by discharging processing, as shown in FIG. 18.

Figure 19A:
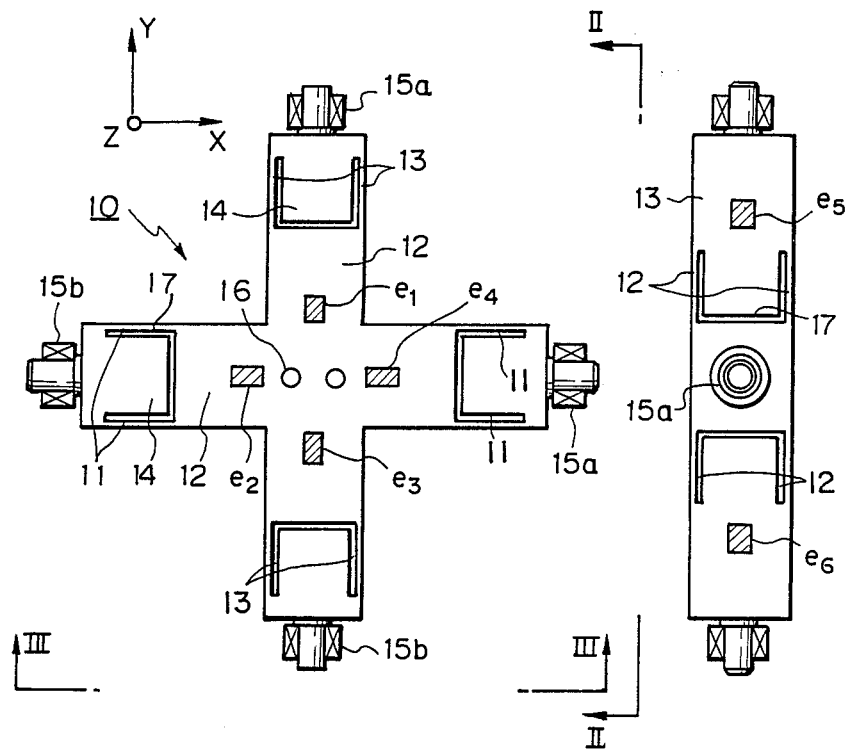
FIGS. 19(a) and (c) are diagrams illustrating the structure of still another embodiment of the present invention.
Figure 19B:
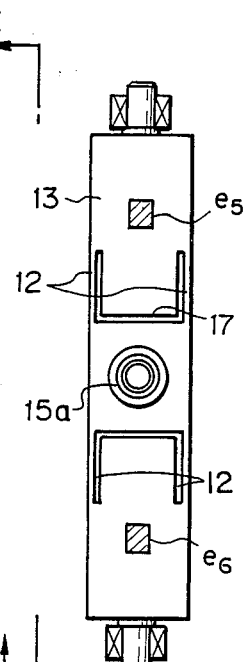
Figure 19C:
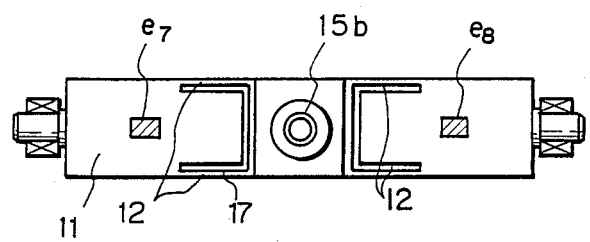

FIGS. 19(a-c) illustrate the structure of the force detecting apparatus of the present invention. FIG. 19(a) is a top view (view seen from the direction Z), FIG. 19(b) is a view showing the section seen along the line II—II in FIG. 19(a), and FIG. 19(c) is a view showing the section taken along the line III—III in FIG. 19(a). The force-detecting apparatus 10 has, as 4 sides of a cruciform structure, two Y-direction parallel plate spring assemblies, each comprising a parallel plate spring 13 deformable in the direction X and a parallel plate spring 12 deformable in the direction Z, and two X-direction parallel plate spring assemblies, each comprising a parallel plate spring 11 deformable in the direction Y and a parallel plate spring 12 deformable in the direction Z. These parallel plate springs can be formed by forming two U-shaped slits 17 orthogonal to each other on each side of a cruciform metal block having a rectangular section by discharging processing or the like. The inner side of each U-shaped slit acts as a displacement-regulating member (stopper) 14 for each parallel plate spring. More specifically, when the parallel plate springs 11, 12 and 13 are deformed under application of a force, if they abut against the deformation-regulating members 14, they are no longer deformed. If the width of the slits is appropriately set, the deformations of the respective parallel plate springs can be controlled within the range of elastic deformation of the plate springs, and plastic deformation or breakage of the plate springs can be prevented. Strain gauges 1 through $3_4$ are attached to respective ones of the Z-direction parallel plate springs 12 symmetrically with respect to the center of the cruciform structure. Strain gauges $e_5$ through $e_8$ are attached to respective ones of the parallel plate springs 13, deformable in the direction X, and the parallel plate springs 11, deformable in the direction Y, symmetrically with respect to the center of the side face of the cruciform body.

Figure 20:
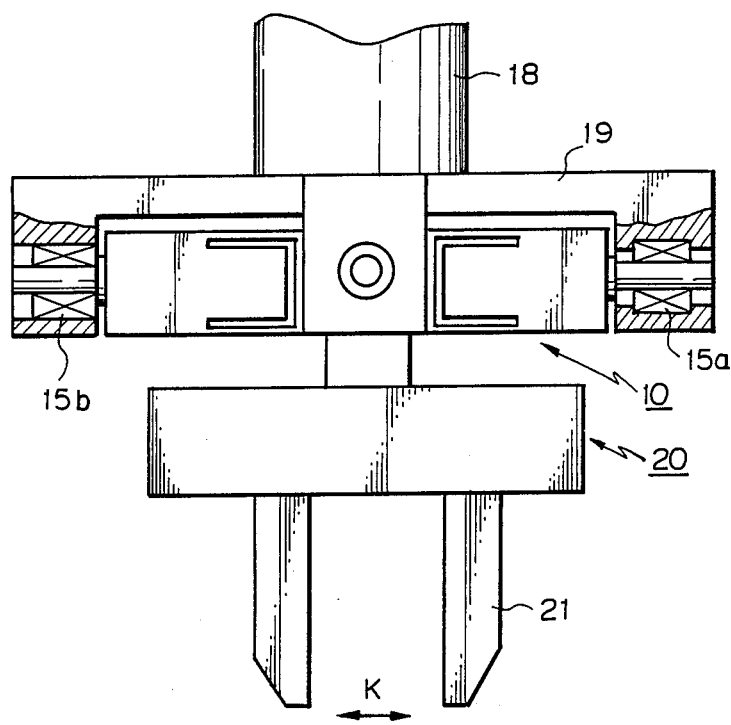
FIG. 20 is a diagram showing an application of the embodiment shown in FIG. 19.
Figure 21:
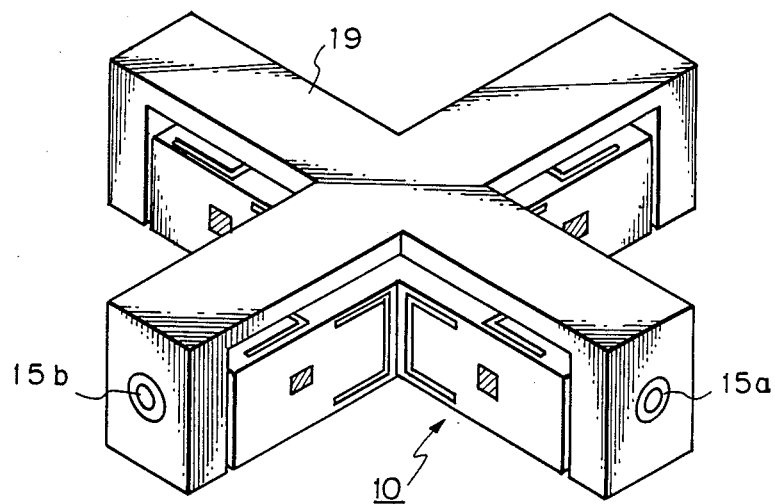
FIG. 21 is a perspective view showing an application of the embodiment shown in FIG. 19.
Figure 26:
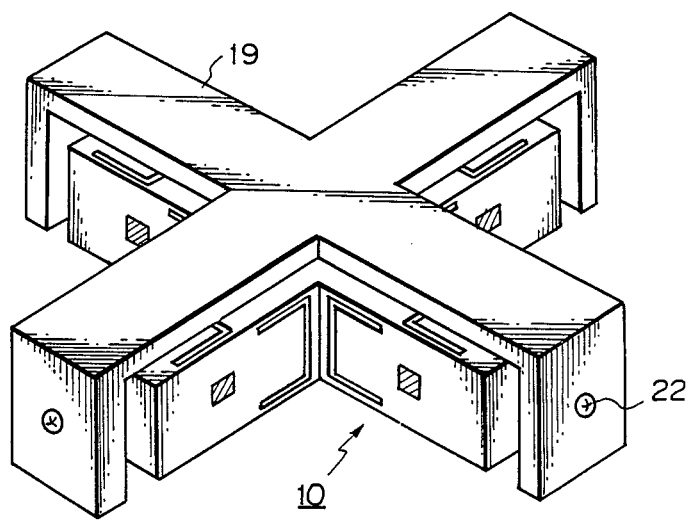
FIG. 26 is a perspective view showing an application of the embodiment shown in FIG. 24.

As shown in FIG. 20, this force-detecting apparatus 10 is attached to the wrist portion 20 of a robot. A cruciform supporting member 19 is secured to the top end of an arm 18 of the robot, and the force-detecting apparatus 10 is supported on this supporting frame 19 through bearings 15a and 15b so that each side of the force-detecting apparatus can rotate relatively to the supporting frame. On both the end portions of the respective sides in the directions X and Y, one bearing 15a is held on the supporting frame 19 so that only rotation is permissible, while the other bearing 15b is held on the supporting frame 19 so that the bearing 15b can rotate and slide in the axial direction. By this arrangement, the displacement of the parallel plate springs can be smoothed and the sensitivity can be increased, and deviation of the central position owing to the deformation of the parallel plate springs can always be kept in a certain direction and no variation of the detected values is brought about, with the result that the detection reliability can be increased. The hand 20 is secured to the central portion of the cruciform force-detecting apparatus 10. Reference numeral 16 in FIG. 19 represents a hole for fixation of the hand. A finger 21 (FIG. 20) performs opening and closing operations in the direction of arrow K to grip an article. Since the force-detecting apparatus 10 is supported on the supporting frame 19 so that the sides in the directions X and Y of the force-detecting apparatus 10 can rotate relatively to the supporting frame 19, a torque around one axis no force to the supporting frame in the direction of this axis but the force is given only to the supporting frame in the direction orthogonal to this axis, and therefore, the sides of the orthogonal supporting frames do not interfere with each other. Accordingly, the respective sides of the supporting frame 19 need not be separated for prevention of mutual interference, and the supporting frame 19 can be integrally formed as shown in FIG. 21.

The operations of the force-detecting apparatus having the above-mentioned structure will now be described with reference to FIGS. 22 and 23. In FIGS. 22 and 23, to facilitate easy understanding, the displacement-regulating members 14 are omitted and the illustration exaggerates the displacement.

Figure 22A:
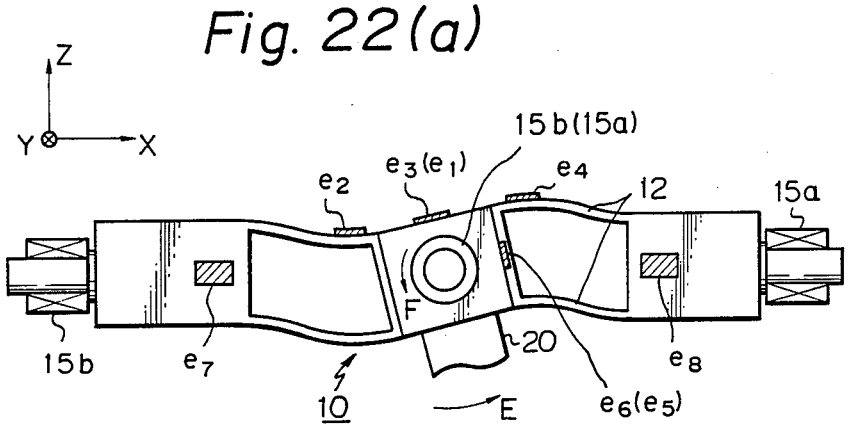
FIGS. 22(a) and (b) and 23(a) and (b) are diagrams illustrating the operation of the embodiment shown in FIG. 19.
Figure 22B:
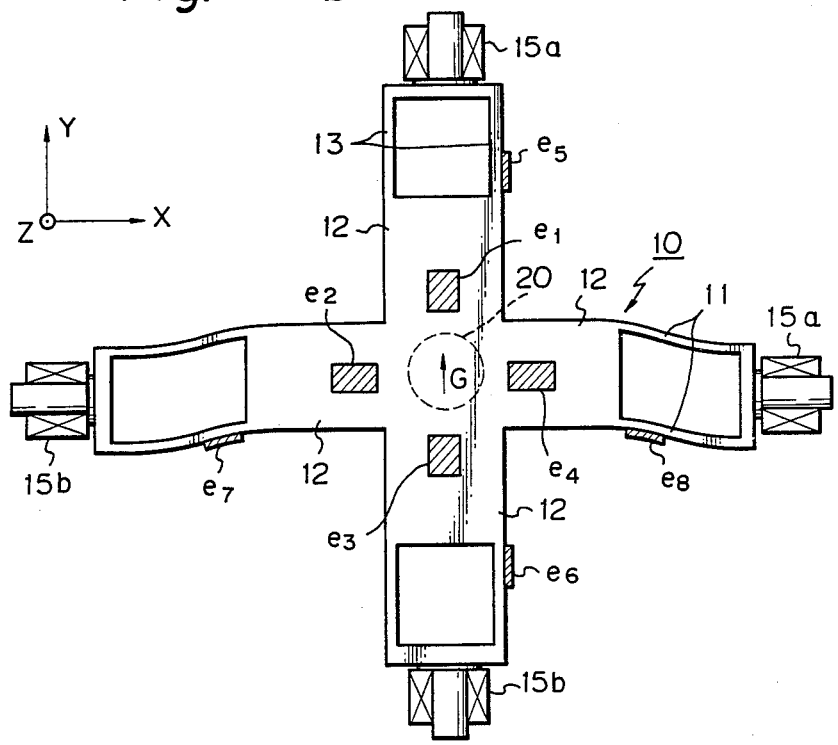

FIG. 22(a) shows the state where a torque around the Y-axis is applied. A torque in the direction of arrow E acts on the hand 20, and two sides of the cruciform structure along the Y-axis are rotated in the direction of arrow F through bearings 15a and 15b. Accordingly, this moment in the direction E acts on the end portions of the two sides of the cruciform structure and the parallel plate springs 12 are deformed as shown in FIG. 22(*a*). Therefore, the strain gauges $e_2$ and $e_4$ are deformed to emit outputs. Other strain gauges are not deformed and they do not emit any output.

FIG. 22(*b*) shows the state where a force is applied to the hand 20 in the direction of arrow G (direction Y). A reaction force acts on the end portions of two sides of the cruciform structure along the X-axis through the supporting frame and the parallel plate springs 11 are deformed as shown in FIG. 22(*b*). Accordingly, only the strain gauges $e_7$ and $e_8$ are deformed and emit outputs, while other strain gauges emit no output.

FIG. 23(*a*) shows the state where a force is applied to the hand 20 in the direction of arrow H (direction Z). A reaction force acts on the end portions of four sides of the cruciform structure along the X- and Y-axes through the supporting frame, and four parallel plate springs 12 (only two springs are shown) are deformed as shown in FIG. 23(*a*). Accordingly, the strain gauges $e_1$ through $e_4$ are deformed and emit outputs, while other strain gauges emit no output.

FIG. 23(*b*) shows the state where a torque around the direction of arrow J (Z-axis) acts on the hand 20. A moment acts on the end portions of the four sides of the cruciform structure through the supporting frame and the parallel plate springs 11 and 13 are deformed as shown in FIG. 23(*b*). Accordingly, the strain gauges $e_3$ through $e_8$ are deformed and emit outputs, while other strain gauges emit no output.

It is noted that the supporting frame is rigid and is not deformed.

An operation expression for calculating the force vector based on the relationships among the forces in the X-, Y-, and Z-axes, the torques around the respective axes, and the respective strain gauges $e_1$ through $e_8$ are as follows:

$$\begin{bmatrix} Fx \\ Fy \\ Fz \\ Tx \\ Ty \\ Tz \end{bmatrix} = \begin{bmatrix} g_{11} & g_{21} & \cdots & g_{81} \\ & & & \\ \vdots & & & \vdots \\ & & & \\ g_{16} & g_{26} & \cdots & g_{86} \end{bmatrix} \cdot \begin{bmatrix} e_1 \\ e_2 \\ \vdots \\ \\ e_z \end{bmatrix}$$

wherein: F stands for the force vector, Fx, Fy, and Fz stand for force components in the directions X, Y, and Z, respectively, and Tx, Ty, and Tz stand for torque components around the X-, Y-, and Z-axes, respectively; G stands for the gain to be multiplied into the output voltage values of the strain gauges, and the longitudinal rows correspond to the six components of the force vector and the lateral lines correspond to the eight strain gauges $e_1$ through $e_8$; and E stands for the output voltage of the strain gauges. If the above formula is solved with respect to the force sensor of the present invention, the following formula is obtained:

$$= \cdot = \begin{bmatrix} 0 & 0 & 0 & 0 & g_{51} & g_{61} & 0 & 0 \\ 0 & 0 & 0 & 0 & 0 & 0 & g_{72} & g_{82} \\ g_{13} & g_{23} & g_{33} & g_{43} & 0 & 0 & 0 & 0 \\ g_{14} & 0 & g_{24} & 0 & 0 & 0 & 0 & 0 \\ 0 & g_{25} & 0 & g_{45} & 0 & 0 & 0 & 0 \\ 0 & 0 & 0 & 0 & g_{56} & g_{66} & g_{76} & g_{86} \end{bmatrix} \cdot \begin{bmatrix} e_1 \\ e_2 \\ e_3 \\ e_4 \\ e_5 \\ e_6 \\ e_7 \\ e_8 \end{bmatrix}$$

Accordingly, the following equations are obtained:

$$-Fx = g_{51} \cdot e_5 + g_{61} \cdot e_6$$
$$-Fy = g_{72} \cdot e_7 + g_{82} \cdot e_8$$
$$-Fz = g_{13} \cdot e_1 + g_{22} \cdot e_2 + g_{33} \cdot e_3 + g_{43} \cdot e_4$$
$$-Tx = g_{14} \cdot e_1 + g_{34} \cdot e_3$$
$$-Ty = g_{25} \cdot e_2 + g_{45} \cdot e_4$$
$$-Tz = g_{56} \cdot e_5 + g_{66} \cdot e_6 + g_{76} \cdot e_7 + g_{86} \cdot e_8$$

Namely, it is seen that in Fx through Fz and Tx through Tz, there is not a portion in which the gain g is "0". For example, if a force Fx in the direction X is applied, outputs are obtained only from the strain gauges $e_3$ and $e_6$, and if a torque Tx around the X-axis is applied, outputs are obtained only from $e_1$ and $e_3$.

In the embodiment shown in FIGS. 19 through 23, a torsion bar may be used instead of the bearings 15*a* and 15*b*. This embodiment will now be described with reference to FIGS. 24 through 28. Namely, this embodiment is the same as the embodiment shown in FIGS. 19 through 23 except that torsion bars 15 are arranged as means for supporting the respective sides of the cruciform body so that they can rotate around the longitudinal axis of each of the arms of the cruciform body. Other structural features and functions are the same as in the embodiment shown in FIGS. 19 through 23.

Figure 25:
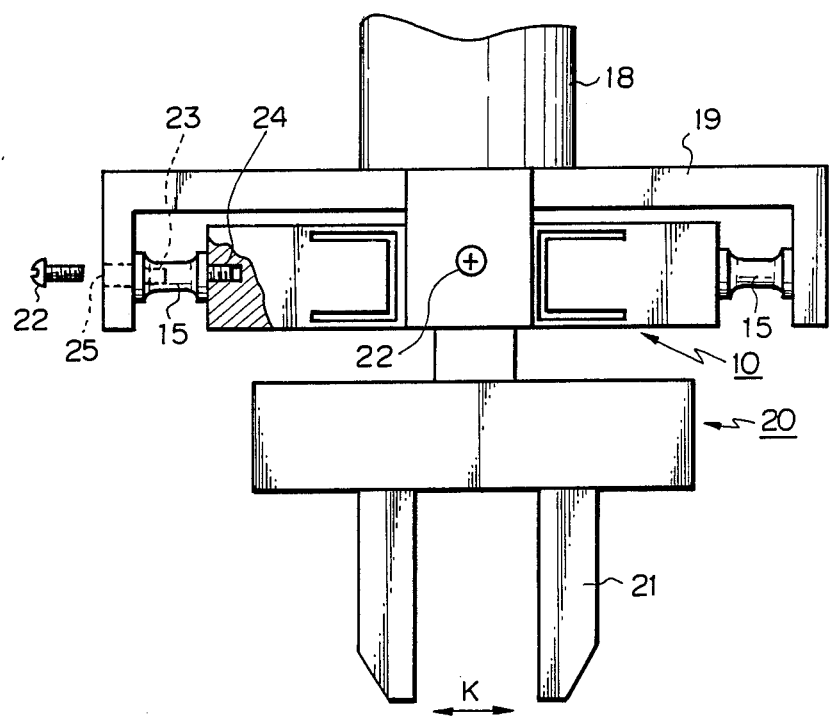
FIG. 25 is a diagram illustrating an application of the embodiment shown in FIG. 24.

As shown in FIG. 25, each torsion bar 15 has a screw 24 extending in the axial direction from one end thereof and is screwed to one end portion of the side of the force-detecting apparatus 10 through this screw. Each torsion bar 15 also has a screw hole on the other end portion and the torsion bar 15 is secured to a supporting frame 19 by a screw 22 secured to this screw hole and extending through a hole 25 of the supporting frame 19. A tensile stress in the axial direction acts on the torsion bar 15 by the clamping force of the screw 22, and the rigidity against deflection is increased. Accordingly, the torsion bar is not deformed by the force rectangular to the axis but responds only to the torsional force and rotates around the axis. Since the torsion bar 15 is different from the bearing in that no frictional force acts thereon, the torsion bar 15 can respond sensitively to a slight torque and perform a high precision rotating operation.

Figure 27A:
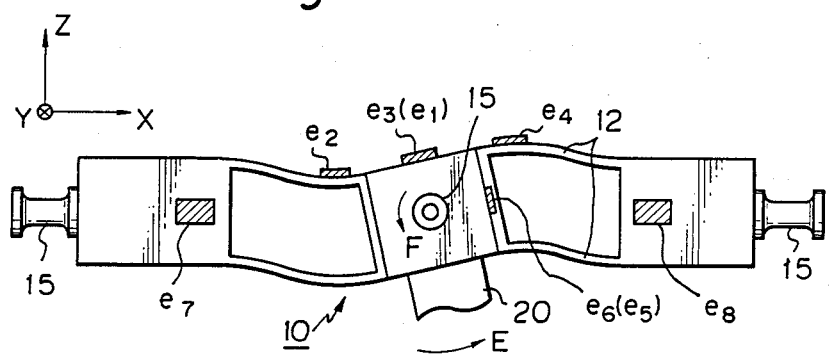
FIGS. 27(a) and (b) and 28(a) and (b) are diagrams illustrating the operation of the embodiment shown in FIG. 24.
Figure 27B:
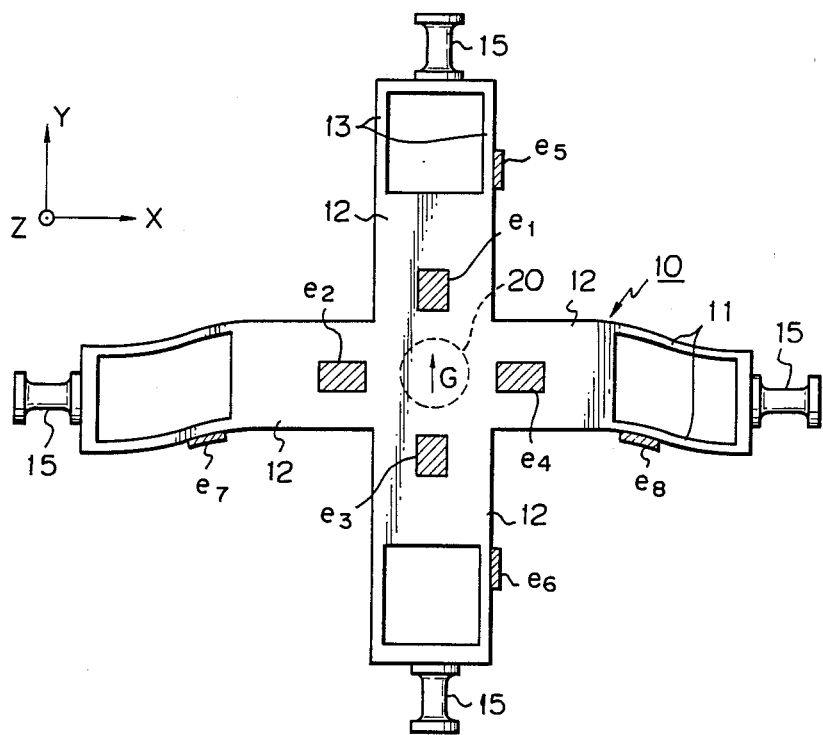
Figure 28A:
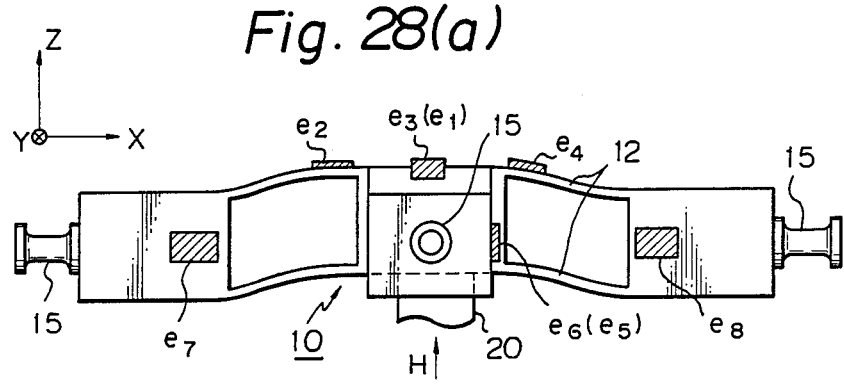
Figure 28B:
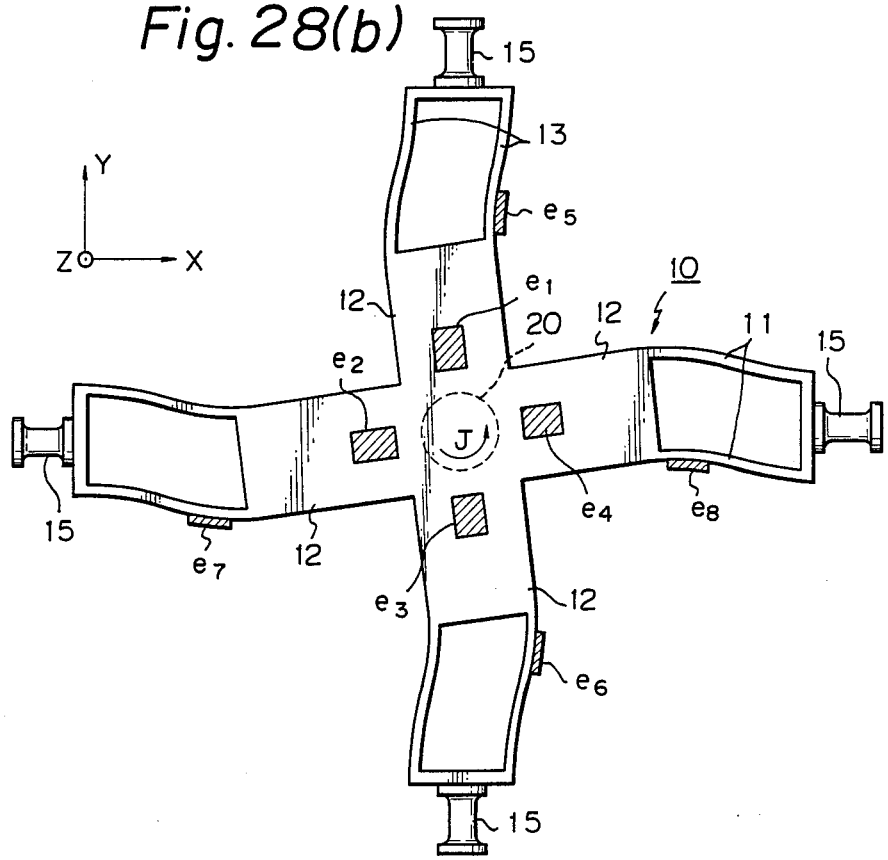

This force-detectng apparatus is supported on an integrally formed supporting frame 19 (see FIG. 26) as in the foregoing embodiment. FIGS. 27 and 28 show the operations of the force-detecting apparatus comprising the above-mentioned torsion bars, and these operations are not substantially different from those of the foregoing embodiment (FIGS. 22 and (23), and thus will not be described in detail.

As is apparent from the foregoing description, since the respective sides of the cruciform body are supported on the supporting frame through bearings or torsion bars rotatable around the long axes of the respective sides, even slight torques around the axes can be detected at a high speed, and each strain gauge is only affected by a force component in one direction and a torque around one axis act without interference from other forces and torques. Accordingly, force vector components can be calculated in a short time by a simple operation expression without constructing a complicated circuit. Therefore, when the apparatus is used for detecting an external force on a robot or the like, if a certain external force is applied to the robot, the robot can be immediately driven and moved in a direction cancelling the external force, and high-speed control of the robot becomes possible. Thus, the operational reliability of the robot is increased. Furthermore, if displacement-regulating means (stoppers) are formed together with the parallel plate springs, plastic deformation or damage of the force-detecting apparatus is not caused and the functions of the force-detecting apparatus can be exerted stably.

Figure 29:
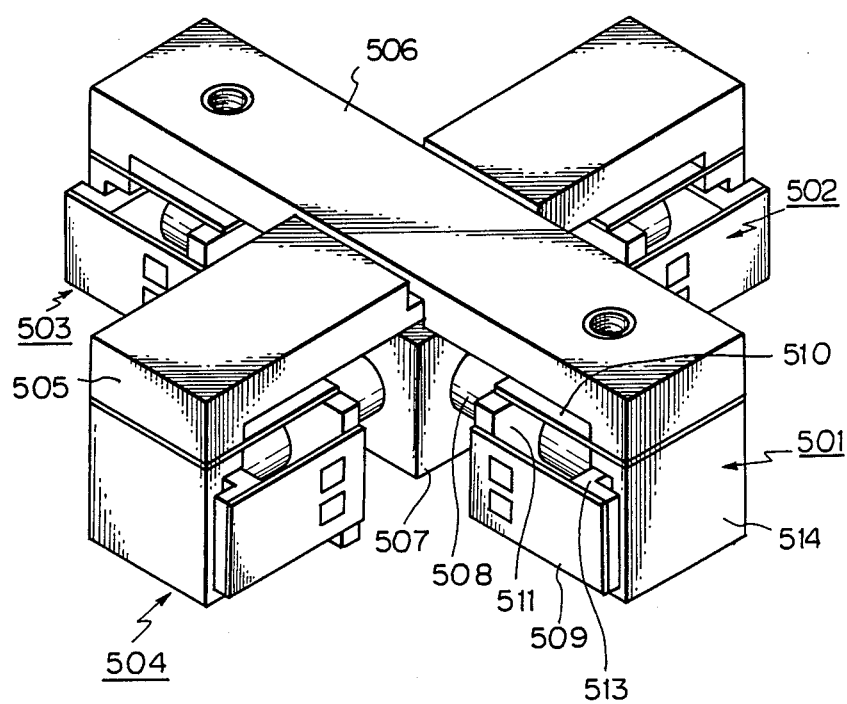
FIG. 29 is a perspective assembly diagram illustrating still another embodiment of the present invention.
Figure 30:
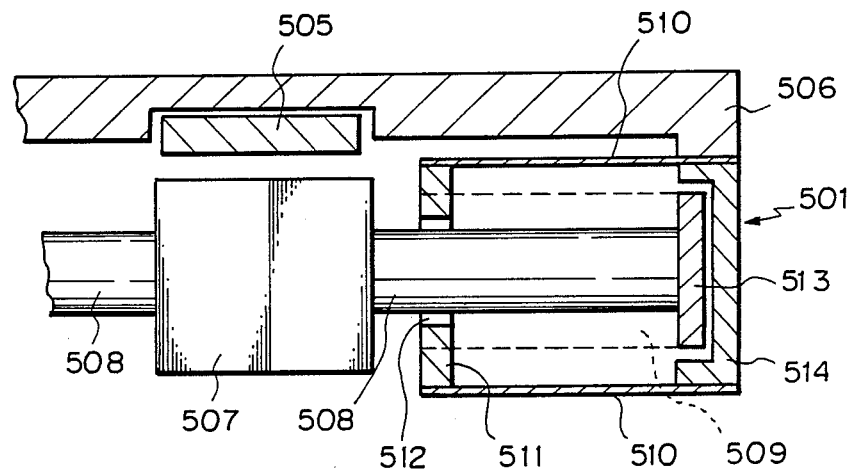
FIG. 30 is a partial sectional view of the embodiment shown in FIG. 29.

FIG. 29 is a perspective view illustrating still another embodiment of the present invention. This embodiment constructed by improving the embodiment shown in FIG. 13 while reducing the dimensions. A cruciform body is constructed by four parallel plate spring assemblies 501 through 504, which are secured to supporting frames 505 and 506. Each parallel plate spring assembly comprises two parallel plate springs 509 and 510, the inner end portions of which are secured to a common rectangular frame 511. The outer end portion of one parallel plate spring 509 is secured to a supporting member 513 and the other end portion of the other parallel plate spring 510 is secured to another supporting member 514. This outer supporting member 514 is secured to the end portions of the supporting frames 505 and 506 arranged in the cruciform shape. A cubic member 507 is arranged in the central portion of the cruciform body. Axial rods 508 are projected outward from four sides of the cubic member 507. Each axial rod 508 is secured to the supporting member 513 through a hole 512 of the common rectangular frame 511 on the inner side of the parallel plate spring assemblies 501 through 504 (see FIG. 30).

If this structure is adopted, the length of each parallel plate spring assembly can be made shorter than in the embodiment shown in FIG. 13, and the size of the apparatus can be reduced. Other structural features and functions are the same as in the embodiment shown in FIG. 13.

Figure 32:
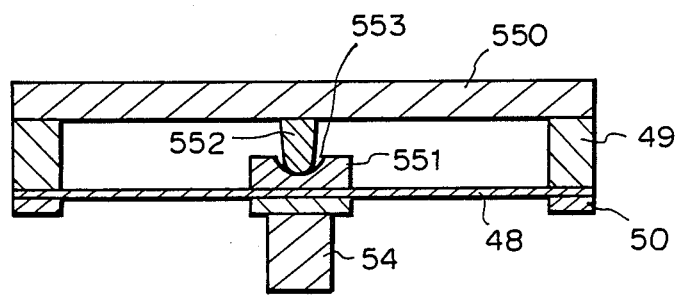
FIG. 32 is a sectional view of the embodiment shown in FIG. 31.
Figure 31:
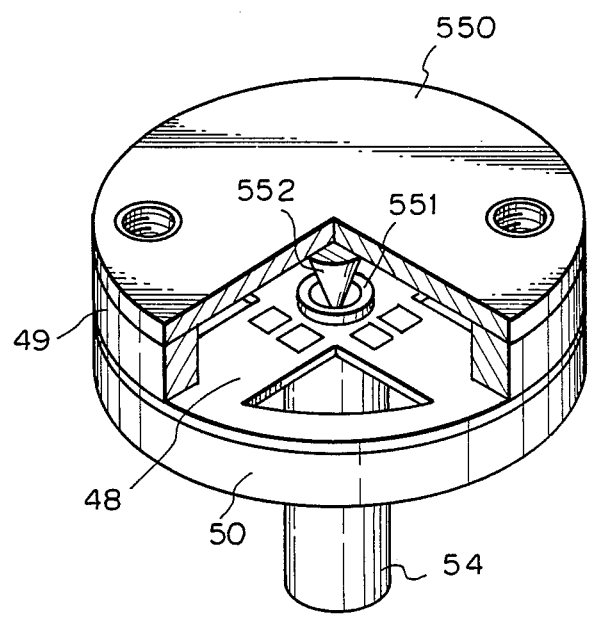
FIG. 31 is a perspective view illustrating still another embodiment of the present invention.

FIGS. 31 and 32 illustrate an improvement of the $\alpha\beta$-module 43 shown in FIG. 9. In the embodiment shown in FIG. 9, the displacement in the direction of the Z-axis is detected by the plate springs $c_1$ and $c_1'$ of the module 30. In the embodiment shown in FIG. 9, the plate spring 48 of the $\alpha\beta$-module 45 for detecting the moments around the X- and Y-axes is also slightly deformed in the direction of the Z-axis. Means for preventing the displacement of this plate spring 48 in the direction of the Z-axis and detecting the displacement in the direction of the Z-axis only by the parallel plate springs $c_1$ and $c_1'$ of the module 30 are shown in FIGS. 31 and 32. A circular plate spring 48 is inserted and secured between annular supporting frames 49 and 50. A rigid plate 550 is secured to the top face of the supporting frame 49, and a projecting rod 552 having a rounded top end is arranged in the central portion of the rigid plate 550. This projecting rod 552 is fitted in a recess 553 of a receiving member 551 arranged in the central portion of the circular plate spring 48. It is preferred that the inner face of the recess 553 be rounded. If this structure is adopted, the circular plate spring 48 is not displaced in the direction of the Z-axis but is deformed only in response to torques around the X- and Y-axes. Accordingly, all of the force in the direction of the Z-axis is transferred to another module for detecting the force in the direction of the Z-axis. Therefore, the detection precision can be increased.

In each of the foregoing embodiments, strain gauges are used for detecting deformations of the plate springs. Other detecting means, for example, optical measuring means or volume measuring means, may be used for detecting deformations of plate springs.

We claim:

1. A force-detecting apparatus, comprising:
    a cruciform comprising first and second elastic members defining orthogonal lines of the cruciform, the orthogonal lines crossing at and defining the center point of the cruciform; each said elastic member comprising at least two parallel plate springs respectively, each parallel plate spring having parallel main surfaces, and the plate springs having opposite ends and defining a center point therebetween coinciding with the center point of the cruciform and an axis extending through the cruciform center point and lying in a plane parallel to the main surfaces of the plate springs, and each said elastic member being deformable in response to a force applied thereto in a direction perpendicular to the main surfaces of the plate springs and a torque applied thereto about the axis;
    a frame member associated with each said elastic member, the opposite ends of said plate springs of each said elastic member being secured to the associated frame member; and
    for each said elastic member:
        first displacement-detecting means for detecting deformation of the elastic member, affixed at predetermined positions on the respective main surfaces of different ones of said parallel plate springs thereof oppositely disposed relative to said center point, and said predetermined positions being symmetric with respect to said center point, and
        second displacement-detecting means for detecting deformation of the elastic member, affixed at predetermined positions on a common said main surface of one of said parallel plate springs thereof, and said predetermined positions being symmetric with respect to said central axis.

2. A force-detecting apparatus as set forth in claim 1, wherein the first and second deformation-detecting means associated with each said elastic member comprise strain gauges.

3. A force-detecting apparatus as set forth in claim 1, wherein, for each said elastic member:
   each said first displacement-detecting means comprises strain gauges arranged on the respective, oppositely disposed main surfaces of the associated parallel plate springs of said elastic member at positions symmetric with each other; and
   each said second displacement-detecting means comprises strain gauges arranged on a common surface of one of the associated parallel plate springs of said elastic member at positions symmetric with each other;
   said force detecting apparatus further comprising, for each said elastic member:
   a first bridge circuit, including the strain gauges on said oppositely disposed main surfaces of the associated parallel plate springs of said elastic member; and
   a second bridge circuit, including the strain gauges on the common surface of one of the associated parallel plate springs of said elastic member.

4. A force-detecting apparatus as set forth in claim 1, wherein a displacement-regulating means is arranged on the inner side of each parallel plate spring to regulate the displacement of the plate spring.

5. A force-detecting apparatus as set forth in claim 4, wherein a thick reinforcing portion is provided on the plate spring at the points where the parallel plate spring and the displacement-regulating means abut.

6. A force-detecting apparatus comprising:
   a plurality of elastic members, each elastic member having a center, formed as an integral module and arranged to detect at least one component of forces in directions corresponding to X-, Y- and Z-axes and torques around the X-, Y- and Z-axes, said plurality of elastic members being connected to each other through central portions thereof;
   said elastic members of said integral module for detecting forces in the directions of the X-, Y-, and Z-axes comprising three sets of parallel plate springs, deformable in the directions of the X-, Y- and Z-axes, respectively, arranged as a cruciform symmetric with respect to the central point;
   plural first displacement-detecting means for detecting displacements of corresponding ones of said elastic members, in the same direction with respect to the center, at positions symmetric with and on either side of the center of the corresponding elastic member; and
   plural second displacement-detecting means for detecting displacements of corresponding ones of said elastic members, in opposite directions with respect to the center of said elastic member, at positions symmetric with and on either side of the center of the corresponding elastic member.

7. A force-detecting apparatus as set forth in claim 6, further comprising a supporting frame;
   wherein end portions of respective sets of parallel plate springs forming the integral module for detecting forces in the directions of the X-, Y-, and -axes are held on the supporting frame so that said respective sets of parallel plate springs can be rotated relative to the supporting frame around the longitudinal axes of the respective sets of parallel plate springs.

8. A force-detecting apparatus as set forth in claim 7 further comprising a plurality of bearings for rotatably connecting the end portions of the respective sets of parallel plate springs of the integral module to the supporting frame.

9. A force-detecting apparatus as set forth in claim 7, further comprising a plurality of torsion bars for rotatably connecting the end portions of the respective sets of parallel plate springs of the integral module to the supporting frame.

10. A force-detecting apparatus comprising:
    a plurality of elastic members, each elastic member having a center, formed as an integral module and arranged to detect at least one component of forces in directions corresponding to X-, Y- and Z-axes and torques around the X-, Y- and Z-axes, said plurality of elastic members being connected to each other through central portions thereof;
    said elastic members of said integral module for detecting forces in the directions of the X- and Y-axes and torques around the Z-axis comprising two sets of parallel plate springs, deformable in the directions of the X- and Y-axes, respectively, arranged as a cruciform symmetric with respect to the central point;
    plural first displacement-detecting means for detecting displacements of corresponding ones of said elastic members, in the same direction with respect to the center, at positions symmetric with and on either side of the center of the corresponding elastic member; and
    plural second displacement-detecting means for detecting displacements of corresponding ones of said elastic members, in opposite directions with respect to the center of said elastic member, at positions symmetric with and on either side of the center of the corresponding elastic member.

11. A force-detecting apparatus comprising:
    a plurality of elastic members, each elastic member having a center, formed as an integral module and arranged to detect at least one component of forces in directions corrresponding to X-, Y- and Z-axes and torques around the X-, Y- and Z-axes, said plurality of elastic members being connected to each other through central portions thereof;
    said elastic members of said integral module for detecting forces in the directions of the X-, Y-, and Z-axes comprise two sets of parallel plate springs, deformable in the directions of the X- and Y-axes, and two sets of parallel plate springs deformable in the direction of the Z-axis, arranged as a cruciform symmetric with respect to the central point;
    plural first displacement-detecting means for detecting displacements of corresponding ones of said elastic members, in the same direction with respect to the center, at positions symmetric with and on either side of the center of the corresponding elastic member; and
    plural second displacement-detecting means for detecting displacements of corresponding ones of said elastic members, in opposite directions with respect to the center of said elastic member, at positions symmetric with and on either side of the center of the corresponding elastic member.

12. A force-detecting apparatus as set forth in claim 11, wherein:
    said parallel plate springs deformable in the directions of the X-, Y-, and Z-axes each have a center; and
    the centers of said parallel plate springs deformable in the direction of the Z-axis are connected to the centers of said parallel plate springs deformable in the direction of the X and Y-axes, respectively.

* * * * *

UNITED STATES PATENT AND TRADEMARK OFFICE
CERTIFICATE OF CORRECTION

PATENT NO. : 4,762,006
DATED : August 9, 1988
INVENTOR(S) : Asakawa et al.

It is certified that error appears in the above-identified patent and that said Letters Patent is hereby corrected as shown below:

Col. 3:

Line 26, delete "19(a) and (c)" and insert --19(a)-(c)--.
    Line 36, delete "24(a) and (c)" and insert --24(a)-(c)--.

Col. 4:

Line 26, delete "shifting" and insert --which shifts--.
    Line 53, delete "of" and insert --oriented in--.

Col. 6:

Line 47, delete "$l_1$" and "$l_2$" and insert --$\ell_1$-- and --$\ell_2$--.

Col. 7:

Line 36, delete "direcion" and insert --direction--.

Col. 12:

Line 46, delete "face".
    Line 68, delete "becomes and insert --become--.

UNITED STATES PATENT AND TRADEMARK OFFICE
CERTIFICATE OF CORRECTION

PATENT NO. : 4,762,006

DATED : August 9, 1988

INVENTOR(S) : Asakawa et al.

It is certified that error appears in the above-identified patent and that said Letters Patent is hereby corrected as shown below:

Col. 13:

Line 26, change "$b_1'$, c2," to --$b_2'$, $c_2$,--.

Col. 14:

Line 12, delete "1" and insert --$e_1$--.
    Line 13, delete "$3_4$" and insert --$\bar{e}_4$--.

Col. 15:

Lines 41-48, change "g11" to --$g_{11}$--;
                change "g21" to --$g_{21}$--;
                change "g81" to --$g_{81}$--;
                change "g16" to --$g_{16}$--;
                change "g26" to --$g_{25}$--; and
                change "g86" to --$g_{86}$--.

Line 45, "=" (first occurrence) should be --F=--.
    Line 45, "=" (second occurrence) should be --G=--.
    Line 53, "=" should be --E=--.

UNITED STATES PATENT AND TRADEMARK OFFICE
CERTIFICATE OF CORRECTION

PATENT NO. : 4,762,006

DATED : August 9, 1988

INVENTOR(S) : Asakawa et al.

It is certified that error appears in the above-identified patent and that said Letters Patent is hereby corrected as shown below:

Col. 16:

Line 8, "= . =" should be --$F=G \cdot E=$--.

Lines 5-11, "g51, g61 ... 0 ... g76, g86" should be --$g_{51}, g_{61} \ldots 0 \ldots g_{76}, g_{86}$--.

Lines 29-35, "g51 ... g86" should be --$g_{51} \ldots g_{86}$--.

Col. 17:

Line 5, delete "-detectng" and insert -- -detecting--.
Line 11, delete "(23)" and insert --23)--.

Signed and Sealed this

Twenty-eighth Day of February, 1989

Attest:

DONALD J. QUIGG

Attesting Officer

Commissioner of Patents and Trademarks